(12) United States Patent
Bush et al.

(10) Patent No.: US 10,552,695 B1
(45) Date of Patent: Feb. 4, 2020

(54) DRIVER MONITORING SYSTEM AND METHOD OF OPERATING THE SAME

(71) Applicant: GM GLOBAL TECHNOLOGY OPERATIONS LLC, Detroit, MI (US)

(72) Inventors: Lawrence A. Bush, Shelby Township, MI (US); Shihchye A. Lin, Orlando, FL (US); Prabhjot Kaur, Troy, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 0 days.

(21) Appl. No.: 16/225,891

(22) Filed: Dec. 19, 2018

(51) Int. Cl.
| | |
|---|---|
| *G06F 21/32* | (2013.01) |
| *B60W 40/09* | (2012.01) |
| *B60W 50/16* | (2012.01) |
| *G06K 9/00* | (2006.01) |
| *G06N 7/00* | (2006.01) |
| *G06F 3/01* | (2006.01) |
| *G06K 9/62* | (2006.01) |

(52) U.S. Cl.
CPC ......... *G06K 9/00845* (2013.01); *B60W 40/09* (2013.01); *B60W 50/16* (2013.01); *G06F 3/013* (2013.01); *G06K 9/6297* (2013.01); *G06N 7/005* (2013.01)

(58) Field of Classification Search
CPC ................................................. G06K 9/00845
See application file for complete search history.

(56) References Cited

U.S. PATENT DOCUMENTS

| | | | |
|---|---|---|---|
| 6,876,298 B2 | 4/2005 | Litkouhi et al. | |
| 7,245,231 B2 | 7/2007 | Kiefer et al. | |
| 7,363,135 B2 | 4/2008 | Lin et al. | |
| 7,366,438 B2 | 4/2008 | Takeuchi et al. | |
| 7,589,643 B2 | 9/2009 | Dagci et al. | |
| 7,739,036 B2 | 6/2010 | Grimm et al. | |
| 8,253,589 B2 | 8/2012 | Grimm et al. | |
| 8,355,852 B2 | 1/2013 | Grimm et al. | |
| 8,593,271 B2 | 11/2013 | Amann | |
| 8,620,549 B2 | 12/2013 | Nickolaou et al. | |
| 9,283,891 B1* | 3/2016 | Kiefer ................. | B60Q 1/0023 |
| 9,545,879 B2 | 1/2017 | Stebbins et al. | |
| 9,669,833 B2 | 6/2017 | Abdel-Rahman et al. | |
| 9,868,443 B2 | 1/2018 | Zeng et al. | |
| 2003/0149545 A1* | 8/2003 | Shu ....................... | B60K 28/06 |
| | | | 702/182 |

(Continued)

*Primary Examiner* — Joseph H Feild
*Assistant Examiner* — Pameshanand Mahase
(74) *Attorney, Agent, or Firm* — Reising Ethington, P.C.

(57) ABSTRACT

A driver monitoring system for a vehicle and method of operating the driver operating system. The method, in one implementation, involves receiving a plurality of glance aim points for a driver of the vehicle; inputting the plurality of glance aim points into a predictive probability of distraction model to obtain a predictive distraction distribution; determining whether one or more informative glance locations are present in the plurality of glance aim points; comparing the predictive distraction distribution to a predictive distraction distribution threshold when one or more informative glance locations are present in the plurality of glance aim points; and alerting the driver when the predictive distraction distribution satisfies or exceeds the predictive distraction distribution threshold.

14 Claims, 10 Drawing Sheets

(56) References Cited

U.S. PATENT DOCUMENTS

| | | | |
|---|---|---|---|
| 2006/0287779 A1* | 12/2006 | Smith | A61B 3/113 |
| | | | 701/1 |
| 2007/0296564 A1 | 12/2007 | Howell et al. | |
| 2009/0287368 A1 | 11/2009 | Bonne | |
| 2011/0109475 A1 | 5/2011 | Basnayake et al. | |
| 2012/0268600 A1 | 10/2012 | Wagner | |
| 2013/0090806 A1 | 4/2013 | Hahne | |
| 2013/0158741 A1 | 6/2013 | Hahne | |
| 2013/0179023 A1 | 7/2013 | Schmidt | |
| 2013/0328699 A1 | 12/2013 | Schramm et al. | |
| 2013/0342334 A1 | 12/2013 | McQueen et al. | |
| 2014/0159887 A1 | 6/2014 | Piasecki et al. | |
| 2014/0346823 A1 | 11/2014 | Stebbins et al. | |
| 2015/0019080 A1* | 1/2015 | Schneider | B60W 30/12 |
| | | | 701/41 |
| 2015/0032288 A1 | 1/2015 | Huth et al. | |
| 2015/0266484 A1* | 9/2015 | Moran | B60W 40/09 |
| | | | 340/576 |
| 2016/0093215 A1 | 3/2016 | Kiefer | |
| 2016/0264047 A1 | 9/2016 | Patel et al. | |

\* cited by examiner

DRIVER MONITORING SYSTEM AND METHOD OF OPERATING THE SAME

INTRODUCTION

The field of technology relates to driver monitoring, and more particularly, to glance pattern monitoring for automotive drivers.

Promoting driver attentiveness and focusing is desirable, yet false positives and over-reporting of threats or potential threats can inundate a driver. It is advantageous to alert drivers of potential threats; however, it can be more advantageous to alert drivers of potential threats of which they are not visually attending to. This involves reconciling threat detection methods with assessing whether the threat is being visually perceived.

SUMMARY

According to one embodiment, there is provided a method of operating a driver monitoring system for a vehicle, comprising the steps of: receiving a plurality of glance aim points for a driver of the vehicle; inputting the plurality of glance aim points into a predictive probability of distraction model to obtain a predictive distraction distribution; determining whether one or more informative glance locations are present in the plurality of glance aim points; comparing the predictive distraction distribution to a predictive distraction distribution threshold when one or more informative glance locations are present in the plurality of glance aim points; and alerting the driver when the predictive distraction distribution satisfies or exceeds the predictive distraction distribution threshold.

According to various embodiments, this method may further include any one of the following features or any technically-feasible combination of some or all of these features:
- the predictive distraction distribution is a graphical or numerical data scheme representing a crash or near crash probability based on prior data;
- fusing the predictive distraction distribution with a predictive saliency distribution when one or more informative glance locations are not present in the plurality of glance aim points;
- determining a current driving state and using the current driving state as input when fusing the predictive saliency distribution and the predictive distraction distribution;
- the predictive probability of distraction model includes a hidden Markov model (HMM);
- the predictive probability of distraction model includes using an observation matrix of event probabilities for given glance locations to obtain the predictive distraction distribution;
- the predictive probability of distraction model includes developing a graphical representation of the plurality of glance aim points;
- the graphical representation is a histogram plot of the plurality of glance aim points;
- the graphical representation is used to develop a glance co-occurrence matrix which captures a plurality of glance transitions with the plurality of glance aim points;
- the step of feeding the glance co-occurrence matrix into a hidden Markov model (HMM);
- the feeding is accomplished in a sliding window fashion in one-step increments;
- factorizing the glance co-occurrence matrix using a non-negative matrix factorization (NMF) technique to develop a plurality of NMF factors;
- deriving a plurality of features from the plurality of non-negative matrix factorization (NMF) factors; and/or
- comparing the plurality of features to an observation matrix of event probabilities for given glance locations and glance transitions to obtain the predictive distraction distribution.

According to another embodiment, there is provided a method of operating a driver monitoring system for a vehicle, comprising the steps of: receiving a plurality of glance aim points for a driver of the vehicle; inputting the plurality of glance aim points into a predictive probability of distraction model, wherein the predictive probability of distraction model includes a hidden Markov model (HMM); comparing the plurality of glance aim points with an observation matrix of event probabilities for given glance locations to obtain a predictive distraction distribution; comparing the predictive distraction distribution to a predictive distraction distribution threshold; and alerting the driver when the predictive distraction distribution satisfies or exceeds the predictive distraction distribution threshold.

According to various embodiments, this method may further include any one of the following features or any technically-feasible combination of some or all of these features:
- determining whether one or more informative glance locations are present in the plurality of glance aim points; and/or
- comparing the predictive distraction distribution to the predictive distraction distribution threshold is only performed when one or more informative glance locations are present in the plurality of glance aim points.

According to yet another embodiment, there is provided a driver monitoring system for a vehicle, comprising: a driver facing camera; and an electronic control unit (ECU) operably coupled to the driver facing camera, wherein the ECU is configured to receive a plurality of glance aim points for a driver of the vehicle from the driver facing camera; input the plurality of glance aim points into a predictive probability of distraction model to obtain a predictive distraction distribution; determine whether one or more informative glance locations are present in the plurality of glance aim points; compare the predictive distraction distribution to a predictive distraction distribution threshold when one or more informative glance locations are present in the plurality of glance aim points; and alert the driver when the predictive distraction distribution satisfies or exceeds the predictive distraction distribution threshold.

BRIEF DESCRIPTION OF THE DRAWINGS

One or more embodiments will hereinafter be described in conjunction with the appended drawings, wherein like designations denote like elements, and wherein.

DETAILED DESCRIPTION

The system and methods described below involve driver distraction prediction for a driver monitoring system using time series glance pattern analysis. The glance pattern analysis results in a predictive distraction distribution that can be used to determine whether an alert should be provided to the driver. The predictive distraction distribution can be a graphical or numerical data scheme representing a crash or near crash probability for a given glance location or glance transition based on prior data. In some embodiments, the glance pattern analysis can be fused with a predictive saliency distribution to estimate or assess potential threats to the vehicle. The predictive saliency distribution is a spatiotemporal camera based predictive distribution over threats that other drivers would be likely to visually attend. The present systems and methods, through a more sophisticated pattern analysis, can help to more efficiently detect distraction than other driver monitoring systems while reducing false alarms.

Figure 1:
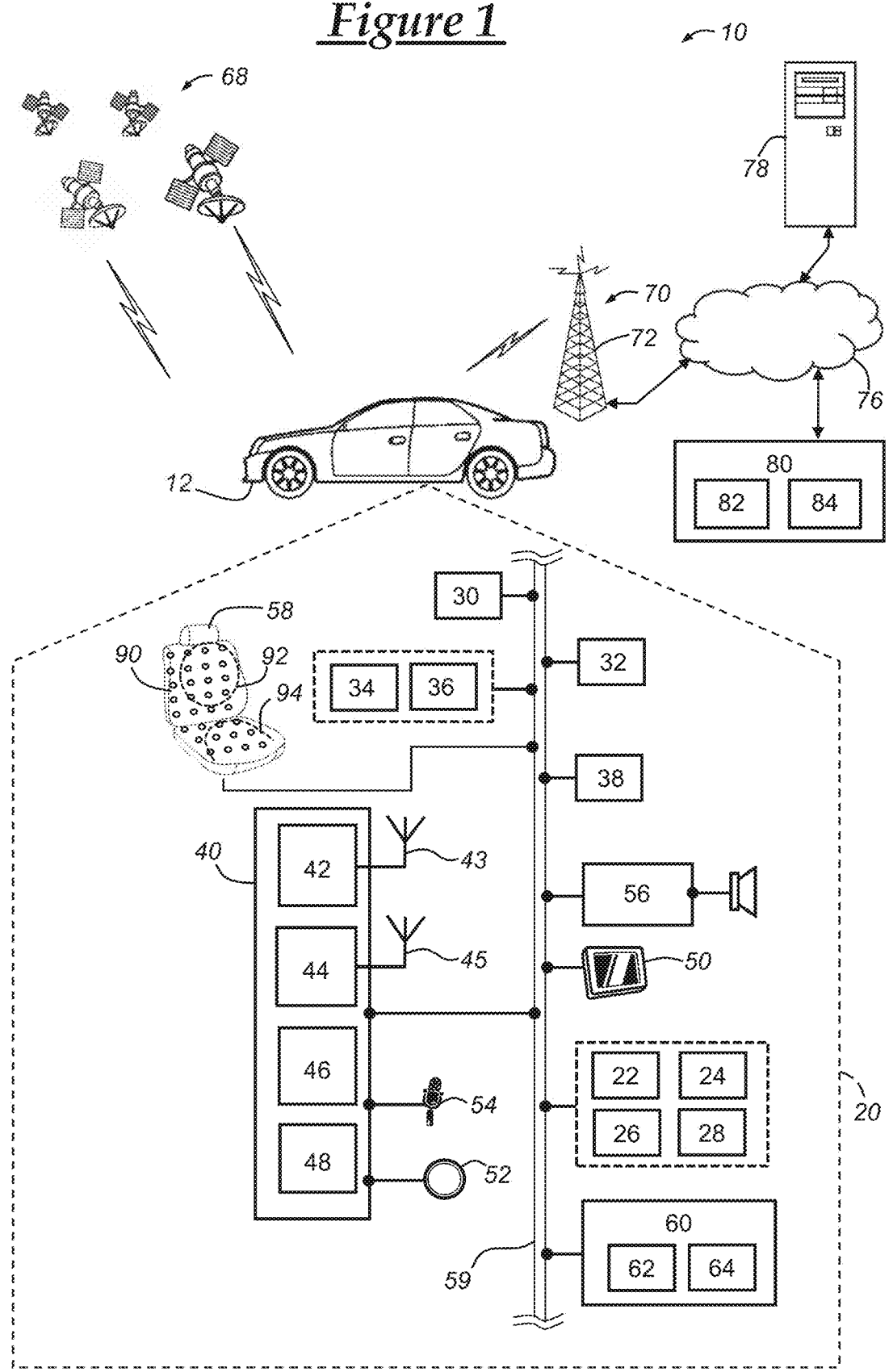
FIG. 1 is a block diagram depicting an embodiment of a driver monitoring system that is capable of utilizing the methods disclosed herein.

With reference to FIG. 1, there is shown an operating environment that comprises a driver monitoring system 10 which can be used to implement the methods disclosed herein. Driver monitoring system 10 generally includes sensors 22-32, a forward facing camera 34, a driver facing camera 36, a GNSS receiver 38, a wireless communications device 40, other vehicle system modules (VSMs) 50-58, and an electronic control unit (ECU) 60. Driver monitoring system 10 further includes a constellation of global navigation satellite system (GNSS) satellites 68, one or more wireless carrier systems 70, a land communications network 76, a computer or server 78, and a backend facility 80. It should be understood that the disclosed methods can be used with any number of different systems and is not specifically limited to the operating environment shown here. The following paragraphs provide a brief overview of one such driver monitoring system 10; however, other systems not shown here could employ the disclosed methods as well. It should also be appreciated that the driver monitoring system 10 and methods may be used with any type of vehicle, including traditional passenger vehicles, sports utility vehicles (SUVs), cross-over vehicles, trucks, vans, buses, recreational vehicles (RVs), motorcycles, etc. These are merely some of the possible applications, as the driver monitoring system and methods described herein are not limited to the exemplary embodiment shown in FIG. 1 and could be implemented with any number of different vehicles.

Any number of different sensors, components, devices, modules, systems, etc. may provide the driver monitoring system 10 with information, data and/or other input. These include, for example, the components shown in FIG. 1, as well as others that are known in the art but are not shown here. It should be appreciated that the host vehicle sensors, cameras, object detection sensors, GNSS receiver, ECU, HMIs, as well as any other component that is a part of and/or is used by the driver monitoring system 10 may be embodied in hardware, software, firmware or some combination thereof. These components may directly sense or measure the conditions for which they are provided, or they may indirectly evaluate such conditions based on information provided by other sensors, components, devices, modules, systems, etc. Furthermore, these components may be directly coupled to a controller or ECU 60, indirectly coupled via other electronic devices, a vehicle communications bus, network, etc., or coupled according to some other arrangement known in the art. These components may be integrated within another vehicle component, device, module, system, etc. (e.g., sensors that are already a part of an active safety system, a traction control system (TCS), an electronic stability control (ESC) system, an antilock brake system (ABS), etc.), they may be stand-alone components (as schematically shown in FIG. 1), or they may be provided according to some other arrangement. In some instances, multiple sensors might be employed to sense a single parameter (e.g., for providing redundancy). It should be appreciated that the foregoing scenarios represent only some of the possibilities, as any type of suitable arrangement or architecture may be used to carry out the methods described herein.

The host vehicle sensors 22-30 may include any type of sensing or other component that provides the present systems and methods with data or information regarding the performance, state and/or condition of the vehicle 12. Information from the host vehicle sensors 22-30 may be used to extrapolate information regarding upcoming objects or threats (e.g., whether the host vehicle 12 is accelerating toward a potential threat, road conditions, etc.). According to the non-limiting example shown in FIG. 1, the host vehicle sensors include host vehicle speed sensors 22-28 and a dynamic sensor unit 30.

The host vehicle speed sensors 22-28 provide the system 10 with speed readings that are indicative of the rotational speed of the wheels, and hence the overall speed or velocity of the vehicle. In one embodiment, individual wheel speed sensors 22-28 are coupled to each of the vehicle's four wheels and separately provide speed readings indicating the rotational velocity of the corresponding wheel (e.g., by counting pulses on one or more rotating wheel(s)). Skilled artisans will appreciate that these sensors may operate according to optical, electromagnetic or other technologies, and that speed sensors 22-28 are not limited to any particular speed sensor type. In another embodiment, the speed sensors could be coupled to certain parts of the vehicle, such as an output shaft of the transmission or behind the speedometer, and produce speed readings from these measurements. It is also possible to derive or calculate speed readings from acceleration readings (skilled artisans appreciate the relationship between velocity and acceleration readings). In another embodiment, speed sensors 22-28 determine vehicle speed relative to the ground by directing radar, laser and/or other signals towards the ground and analyzing the reflected signals, or by employing feedback from a navigation unit that has Global Positioning System (GPS) capabilities (e.g., GNSS receiver 38). It is possible for the speed readings to be provided to the system 10 by some other module, subsystem, system, etc., like a powertrain or engine control module or a brake control module. Any other known speed sensing techniques may be used instead.

Dynamic sensor unit 30 provides the system with dynamic readings that pertain to the various dynamic conditions occurring within the vehicle, such as acceleration and yaw rate. Unit 30 may include any combination of sensors or sensing elements that detect or measure vehicle dynamics, and it may be packaged separately or in a single unit. According to one exemplary embodiment, dynamic sensor unit 30 is an integrated inertial measurement unit (IMU) that includes a yaw rate sensor, a lateral acceleration sensor, and a longitudinal acceleration sensor. Some examples of suitable acceleration sensor types include micro-electromechanical system (MEMS) type sensors and tuning fork-type sensors, although any type of acceleration sensor may be used. Depending on the particular needs of the system, the acceleration sensors may be single- or multi-axis sensors, may detect acceleration and/or deceleration, may detect the magnitude and/or the direction of the acceleration as a vector quantity, may sense or measure acceleration directly, may calculate or deduce acceleration from other readings like vehicle speed readings, and/or may provide the g-force acceleration, to cite a few possibilities. Although dynamic sensor unit 30 is shown as a separate unit, it is possible for this unit or elements thereof to be integrated into some other unit, device, module, system, etc.

Object detection sensor 32 provides the system 10 with sensor reading and object data that pertain to nearby vehicles, pedestrians, or other objects or threats surrounding the vehicle 12. The object sensor readings can be representative of the presence, position, velocity, and/or acceleration of nearby vehicles, as well as of nearby pedestrians and other objects. This data may be absolute in nature (e.g., an object velocity or acceleration relative to ground or some other frame of reference) or the data may be relative in nature (e.g., an object velocity or acceleration relative to the host vehicle). While only one object detection sensor 32 is schematically illustrated, in some embodiments, multiple object detection sensors are included to monitor various positions around the vehicle 12. Each of the object detection sensors may be a single sensor or a combination of sensors, and may include one or more radar devices, laser devices, lidar devices, ultrasound devices, vision devices, other known devices or combinations thereof. In an advantageous embodiment, the object detection sensor 32 is a radar sensor or a lidar sensor. In a further advantageous embodiment, the object detection sensor 32 is a penetrating radar sensor.

Of course, other vehicle sensors that provide information as to the state of the vehicle 12 could be used in addition to or in lieu of those described above. Some potential examples include a V2X communication unit to provide information relating to other vehicles, infrastructure, or pedestrians (e.g., V2V, V2I, or V2P); an ambient sensor to provide readings relating to outside weather events or other environmental events; steering angle sensors; accelerator and brake pedal sensors; stability sensors; and gear selection sensors, to cite just a few. Further, some implementations of the present systems and methods may not have all of the vehicle sensors or other components described herein.

An environmental camera 34 and a driving facing camera 36 can be used to provide environmental camera images and information relating to glance patterns of the driver of vehicle 12, respectively. In an advantageous embodiment, the environmental camera 34 is a forward-facing camera that obtains camera images of the environment ahead of the vehicle 12. However, it is possible for the camera 34 to face other directions and for the methods to assess error threats in other surrounding areas of the vehicle (e.g., with a backup camera when the vehicle 12 is in reverse). The environmental camera 34 and/or the driving facing camera 36 may be connected directly or indirectly to the ECU 60 for processing input from the cameras. Cameras 34, 36 may be of any suitable camera type (e.g., charge coupled device (CCD), complementary metal oxide semiconductor (CMOS), etc.) and may have any suitable lens known in the art so that it is not limited to any particular type, brand or model. In one particular embodiment, the cameras 34, 36 are both mounted to a pair of glasses worn by the driver of the vehicle 12. In another embodiment, the cameras 34, 36 are integrated in a single camera module mounted near or on the windshield or rearview mirror of the vehicle 12. In some embodiments, only one camera may be used to obtain both the environmental camera images and the driver glance images. Other camera configurations are certainly possible, such as mounting the environmental camera 34 on the exterior of vehicle 12, and mounting the driver facing camera 36 near the rear view mirror, to cite a few examples. Some non-limiting examples of potential embodiments or features that may be used with cameras 34, 36 include: infrared LEDs for night vision; wide angle or fish eye lenses; surface mount, flush mount, license mount, or side mount cameras; stereoscopic arrangements with multiple cameras; cameras integrated into tail lights, brake lights, or other components at the rear end of the vehicle; and wired or wireless cameras, to cite a few possibilities. Adaptations of the methods described herein to account for various camera types and/or positions for cameras 34, 36 can be accomplished offline before running the methodology in real-time or almost-real time.

Cameras 34, 36 may provide a plurality of images (e.g., derived from streaming video or other captured video) to ECU 60, which may then process the images to develop a predictive distraction distribution, a predictive saliency distribution, and/or a glance track probability distribution, as detailed further below. In one embodiment, the cameras 34, 36 continuously transmit video data to ECU 60 while the vehicle's ignition or primary propulsion system is on or activated. The video data may be interlaced or progressive scan type video data or interlaced scan type video data to ECU 60. The ECU 60 may then decode, convert, or otherwise process the video data such that the video encoded in the data may be adequately processed and used by the various methods described herein. Other image processing may be carried out by the processor of the ECU 60 or other processing device in vehicle 12.

As will be discussed more below, through use of image processing techniques, the processor may recognize certain objects, such as an upcoming threat to the vehicle 12 that the driver may not be paying attention to. In one embodiment, ECU 60 may use image processing software that may distinguish certain objects in the captured images and, through analysis of a series of images, possibly in combination with information from one or more vehicle sensors such as the sensor 32, may determine a position, distance, velocity and/or acceleration of such distinguished threats or objects with respect to vehicle 12.

Any of the devices 22-36 may be stand-alone, as illustrated in FIG. 1, or they may be incorporated or included within some other device, unit or module (e.g., some of the sensors 22-28 could be packaged in an inertial measurement unit (IMU), the camera 34 could be integrated with an active safety system, etc.). Furthermore, any of the devices 22-36 may be dedicated, as depicted in FIG. 1, or they may be part of or shared by other systems or sub-systems in the vehicle (e.g., the camera 34 and/or some of the sensors 22-30 could be part of a semi-autonomous driving system). The video input and/or sensor input devices 22-36 may be directly provided to ECU 60 or indirectly provided through some other device, module and/or system, as is commonly known in the art. Accordingly, the devices 22-36 are not limited to the schematic representation in FIG. 1 or the exemplary descriptions above, nor are they limited to any particular embodiment or arrangement so long as they can be used with the method described herein.

Global navigation satellite system (GNSS) receiver 38 receives radio signals from a constellation of GNSS satellites 68. GNSS receiver 38 can be configured to comply with and/or operate according to particular regulations or laws of a given geopolitical region (e.g., country). The GNSS receiver 38 can be configured for use with various GNSS implementations, including global positioning system (GPS) for the United States, BeiDou Navigation Satellite System (BDS) for China, Global Navigation Satellite System (GLONASS) for Russia, Galileo for the European Union, and various other navigation satellite systems. For example, the GNSS receiver 38 may be a GPS receiver, which may receive GPS signals from a constellation of GPS satellites 68. And, in another example, GNSS receiver 38 can be a BDS receiver that receives a plurality of GNSS (or BDS) signals from a constellation of GNSS (or BDS) satellites 68. In either implementation, GNSS receiver 38 can include at least one processor and memory, including a non-transitory computer readable memory storing instructions (software) that are accessible by the processor for carrying out the processing performed by the receiver 38.

GNSS receiver 38 may be used to provide navigation and other position-related services to the vehicle driver. Navigation information, such as information concerning upcoming events that may impact travel, can be presented on the display 50 or can be presented verbally such as is done when supplying turn-by-turn navigation. The navigation services can be provided using a dedicated in-vehicle navigation module (which can be part of GNSS receiver 38 and/or incorporated as a part of wireless communications device 40 or other VSM), or some or all navigation services can be done via the vehicle communications device 40 (or other telematics-enabled device) installed in the vehicle, wherein the position or location information is sent to a remote location for purposes of providing the vehicle with navigation maps, map annotations (points of interest, restaurants, etc.), route calculations, and the like. The position information can be supplied to the vehicle backend facility 80 or other remote computer system, such as computer 78, for other purposes, such for training purposes in developing the predictive distraction distribution and/or the predictive saliency distribution, as discussed below.

Wireless communications device 40 is capable of communicating data via short-range wireless communications (SRWC) and/or via cellular network communications through use of a cellular chipset 44, as depicted in the illustrated embodiment. In one embodiment, the wireless communications device 40 is a central vehicle computer that is used to carry out at least part of the methods discussed below. In the illustrated embodiment, wireless communications device 40 includes an SRWC circuit 42, a cellular chipset 44, a processor 46, memory 48, and antennas 43 and 45. In one embodiment, wireless communications device 40 may be a standalone module or, in other embodiments, device 40 may be incorporated or included as a part of one or more other vehicle system modules, such as a center stack module (CSM), a body control module (BCM), an infotainment module, a head unit, and/or a gateway module. In some embodiments, the device 40 can be implemented as an OEM-installed (embedded) or aftermarket device that is installed in the vehicle. In some embodiments, the wireless communications device 40 is a telematics unit (or telematics control unit) that is capable of carrying out cellular communications using one or more cellular carrier systems 70. The telematics unit can be integrated with the GNSS receiver 38 so that, for example, the GNSS receiver 38 and the wireless communications device (or telematics unit) 40 are directly connected to one another as opposed to being connected via communications bus 59.

In some embodiments, the wireless communications device 40 can be configured to communicate wirelessly according to one or more short-range wireless communications (SRWC) such as any of the Wi-Fi™, WiMAX™, Wi-Fi Direct™, other IEEE 802.11 protocols, ZigBee™, Bluetooth™, Bluetooth™ Low Energy (BLE), or near field communication (NFC). As used herein, Bluetooth™ refers to any of the Bluetooth™ technologies, such as Bluetooth Low Energy™ (BLE), Bluetooth™ 4.1, Bluetooth™ 4.2, Bluetooth™ 5.0, and other Bluetooth™ technologies that may be developed. As used herein, Wi-Fi™ or Wi-Fi™ technology refers to any of the Wi-Fi™ technologies, such as IEEE 802.11b/g/n/ac or any other IEEE 802.11 technology. The short-range wireless communication (SRWC) circuit 42 enables the wireless communications device 40 to transmit and receive SRWC signals, such as BLE signals. The SRWC circuit may allow the device 40 to connect to another SRWC device. Additionally, in some embodiments, the wireless communications device may contain a cellular chipset 44 thereby allowing the device to communicate via one or more cellular protocols, such as those used by cellular carrier system 70. In such a case, the wireless communications device becomes user equipment (UE) usable in carrying out cellular communications via cellular carrier system 70.

Wireless communications device 40 may enable vehicle 12 to be in communication with one or more remote networks (e.g., one or more networks at backend facility 80 or computers 78) via packet-switched data communication. This packet-switched data communication may be carried out through use of a non-vehicle wireless access point that is connected to a land network via a router or modem. When used for packet-switched data communication such as TCP/IP, the communications device 40 can be configured with a static IP address or can be set up to automatically receive an assigned IP address from another device on the network such as a router or from a network address server. Packet-switched data communications may also be carried out via use of a cellular network that may be accessible by the device 40. Communications device 40 may, via cellular chipset 44, communicate data over wireless carrier system 70. In such an embodiment, radio transmissions may be used to establish a communications channel, such as a voice channel and/or a data channel, with wireless carrier system 70 so that voice and/or data transmissions can be sent and received over the channel.

Processor 46 can be any type of device capable of processing electronic instructions including microprocessors, microcontrollers, host processors, controllers, vehicle communication processors, and application specific integrated circuits (ASICs). It can be a dedicated processor used only for communications device 40 or can be shared with other vehicle systems. Processor 46 executes various types of digitally-stored instructions, such as software or firmware programs stored in memory 48, which enable the device 40 to provide a wide variety of services. For instance, processor 46 can execute programs or process data to carry out at least a part of the methods discussed herein. Memory 48 may be a temporary powered memory, any non-transitory computer-readable medium, or other type of memory. For example, the memory can be any of a number of different types of RAM (random-access memory, including various types of dynamic RAM (DRAM) and static RAM (SRAM)), ROM (read-only memory), solid-state drives (SSDs) (including other solid-state storage such as solid state hybrid drives (SSHDs)), hard disk drives (HDDs), magnetic or optical disc drives. Similar components to those previously described (processor 46 and/or memory 48, as well as SRWC circuit 42 and cellular chipset 44) can be included in another control module and/or various other VSMs that typically include such processing/storing capabilities, such as ECU 60.

The wireless communications device 40 is connected to the bus 59, and can receive sensor data from one or more vehicle sensors 22-32 and/or the cameras 34, 36 and, thereafter, the vehicle 12 can send this data (or other data derived from or based on this data) to other devices or networks, including the vehicle backend facility 80. In some embodiments, however, all or some data is processed by the ECU 60 or another module. In an advantageous embodiment, real-time or almost-real-time processing is all done via ECU 60 to avoid processing delays. Training for the methods, however, may wholly or partially be processed using computer 78 and/or backend facility 80 (including servers 82 and databases 84).

Vehicle electronics 20 also includes a number of vehicle-user interfaces that provide vehicle occupants with a means of providing and/or receiving information, including visual display 50, pushbutton(s) 52, microphone 54, audio system 56, and/or haptic feedback device 58. As used herein, the term "vehicle-user interface" broadly includes any suitable form of electronic device, including both hardware and software components, which is located on the vehicle 12 and enables a vehicle user to communicate with or through a component of the vehicle. Vehicle-user interfaces 50-54 are also onboard vehicle sensors that can receive input from a user or other sensory information. The pushbutton(s) 52 allow manual user input into the communications device 40 to provide other data, response, or control input. Audio system 56 provides audio output to a vehicle occupant and can be a dedicated, stand-alone system or part of the primary vehicle audio system. According to the particular embodiment shown here, audio system 56 is operatively coupled to both vehicle bus 59 and an entertainment bus (not shown) and can provide AM, FM and satellite radio, CD, DVD and other multimedia functionality. This functionality can be provided in conjunction with or independent of an infotainment module. Audio system 56 can be used to provide directional audio awareness when a driver of the vehicle 12 should be alerted to a potential threat. Microphone 54 provides audio input to the wireless communications device 40 to enable the driver or other occupant to provide voice commands and/or carry out hands-free calling via the wireless carrier system 70. For this purpose, it can be connected to an on-board automated voice processing unit utilizing human-machine interface (HMI) technology known in the art. Visual display or touch screen 50 is preferably a graphics display and can be used to provide a multitude of input and output functions. Display 50 can be a touch screen on the instrument panel, a heads-up display reflected off of the windshield, or a projector that can project graphics for viewing by a vehicle occupant. For example, in one embodiment, the display 50 is an augmented reality display shown through the windshield of the vehicle 12. Haptic feedback device 58 can be used to provide tactile sensations to the driver of the vehicle 12. In this embodiment, the haptic feedback device 58 is a seat 90. Areas 92, 94 can be activated, for example, to alert a driver of the vehicle 12 that there is a potential threat toward the corresponding side of the vehicle. Various other vehicle-user interfaces can also be utilized, as the interfaces of FIG. 1 are only an example of one particular implementation. Accordingly, if a driver of the vehicle 12 is distracted, he or she can be alerted using the one or more vehicle-user interfaces, as discussed more below.

The ECU 60 controls various components of the driver monitoring system 10 and handles vehicle-based processing of many, if not all, of the real-time or almost-real-time processing required to carry out the methods herein. Accordingly, the ECU 60 may obtain feedback or information from numerous sources, such as the sensors 22-32 and cameras 34, 36, and then use such feedback or information to effectively monitor the driver and/or potential threats to the vehicle 12. The ECU 60 may be considered a controller, a control module, etc., and may include any variety of electronic processing devices, memory devices, input/output (I/O) devices, and/or other known components, and may perform various control and/or communication related functions. In an example embodiment, ECU 60 includes an electronic memory device 62 that stores sensor readings (e.g., sensor readings from sensors 22-32), images or video information (e.g., images or video feed from cameras 34, 36), look up tables or other data structures (e.g., one or more matrices or models as described below), algorithms (e.g., the algorithms embodied in the methods described below), etc. The memory device 62 may maintain a buffer consisting of data collected over a predetermined period of time or during predetermined instances (e.g., glance aim points of a driver, sensor readings, etc.). The memory device 62 or just a portion thereof, can be implemented or maintained in the form of an electronic data structure, as is understood in the art. ECU 60 also includes an electronic processing device 64 (e.g., a microprocessor, a microcontroller, an application specific integrated circuit (ASIC), etc.) that executes instructions for software, firmware, programs, algorithms, scripts, etc. that are stored in memory device 62 and may partially govern the processes and methods described herein.

Depending on the particular embodiment, the ECU 60 may be a stand-alone vehicle electronic module (e.g., a specialized or dedicated driver monitoring controller), it may be incorporated or included within another vehicle electronic module (e.g., a video controller), or it may be part of a larger network or system (e.g., an active safety system), or it may be a slave control unit implementing low-level controls on the basis of a supervising vehicle control unit, to name a few possibilities. Accordingly, the ECU 60 is not limited to any one particular embodiment or arrangement and may be used by the present method to control one or more aspects of the driver monitoring system 10 operation. The driver monitoring system 10 and/or ECU 60 may also include a calibration file, which is a setup file that defines the commands given to actuating components such as the display 50, audio system 56, and/or haptic feedback device 58.

Wireless carrier system 70 may be any suitable cellular telephone system. Carrier system 70 is shown as including a cellular tower 72; however, the carrier system 70 may include one or more of the following components (e.g., depending on the cellular technology): cellular towers, base transceiver stations, mobile switching centers, base station controllers, evolved nodes (e.g., eNodeBs), mobility management entities (MMEs), serving and PGN gateways, etc., as well as any other networking components required to connect wireless carrier system 70 with the land network 76 or to connect the wireless carrier system with user equipment (UEs, e.g., which can include telematics equipment in vehicle 12). Carrier system 70 can implement any suitable communications technology, including GSM/GPRS technology, CDMA or CDMA2000 technology, LTE technology, etc.

Apart from using wireless carrier system 70, a different wireless carrier system in the form of satellite communication can be used to provide uni-directional or bi-directional communication with the vehicle. This can be done using one or more communication satellites (not shown) and an uplink transmitting station (not shown). Uni-directional communication can be, for example, satellite radio services, wherein programming content (news, music, etc.) is received by the uplink transmitting station, packaged for upload, and then sent to the satellite, which broadcasts the programming to subscribers. Bi-directional communication can be, for example, satellite telephony services using the one or more communication satellites to relay telephone communications between the vehicle 12 and the uplink transmitting station. If used, this satellite telephony can be utilized either in addition to or in lieu of wireless carrier system 70.

Land network 76 may be a conventional land-based telecommunications network that is connected to one or more landline telephones and connects wireless carrier system 70 to vehicle backend facility 80. For example, land network 76 may include a public switched telephone network (PSTN) such as that used to provide hardwired telephony, packet-switched data communications, and the Internet infrastructure. One or more segments of land network 76 could be implemented through the use of a standard wired network, a fiber or other optical network, a cable network, power lines, other wireless networks such as wireless local area networks (WLANs), or networks providing broadband wireless access (BWA), or any combination thereof.

Computers 78 (only one shown) can be some of a number of computers accessible via a private or public network such as the Internet. In one embodiment, each such computer 78 can be used for one or more purposes, such as for training and initial development of the predictive probability of distraction model and/or the predictive saliency distribution. Other such accessible computers 78 can be, for example: a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12, backend facility 80, or both. A computer 78 can also be used for providing Internet connectivity such as DNS services or as a network address server that uses DHCP or other suitable protocol to assign an IP address to vehicle 12.

Vehicle backend facility 80 is located remotely from vehicle 12. The backend facility 80 may be designed to provide the vehicle electronics 20 with a number of different system back-end functions through use of one or more electronic servers 82 and, in many cases, may provide processing capabilities for the initial training of the models described herein, while most real-time or almost-real-time processing is done at the vehicle 12, such as with ECU 60.

The backend facility 80 may be a physical call center, or it could be a cloud-based server or the like. The backend facility 80 includes vehicle backend servers 82 and databases 84, which may be stored on a plurality of memory devices. Vehicle backend facility 80 may include any or all of these various components and, preferably, each of the various components are coupled to one another via a wired or wireless local area network. Backend facility 80 may receive and transmit data via a modem connected to land network 76. Data transmissions may also be conducted by wireless systems, such as IEEE 802.11x, GPRS, and the like. Those skilled in the art will appreciate that, although only one backend facility 80 and one computer 78 are depicted in the illustrated embodiment, numerous remote facilities 80 and/or computers 78 may be used. Moreover, a plurality of backend facilities 80 and/or computers 78 can be geographically distributed and can each coordinate information and services with one another.

Servers 82 can be computers or other computing devices that include at least one processor and that include memory. The processors can be any type of device capable of processing electronic instructions including microprocessors, microcontrollers, host processors, controllers, vehicle communication processors, and application specific integrated circuits (ASICs). The processors can be dedicated processors used only for servers 82 or can be shared with other systems. The at least one processor can execute various types of digitally-stored instructions, such as software or firmware, which enable the servers 82 to provide a wide variety of services. This software may be stored in computer-readable memory and can be any suitable non-transitory, computer-readable medium. For example, the memory can be any of a number of different types of RAM (random-access memory, including various types of dynamic RAM (DRAM) and static RAM (SRAM)), ROM (read-only memory), solid-state drives (SSDs) (including other solid-state storage such as solid state hybrid drives (SSHDs)), hard disk drives (HDDs), magnetic or optical disc drives. For network communications (e.g., intra-network communications, inter-network communications including Internet connections), the servers can include one or more network interface cards (NICs) (including wireless NICs (WNICs)) that can be used to transport data to and from the computers. These NICs can allow the one or more servers 82 to connect with one another, databases 84, or other networking devices, including routers, modems, and/or switches. In one particular embodiment, the NICs (including WNICs) of servers 82 may allow SRWC connections to be established and/or may include Ethernet (IEEE 802.3) ports to which Ethernet cables may be connected to that can provide for a data connection between two or more devices. Backend facility 80 can include a number of routers, modems, switches, or other network devices that can be used to provide networking capabilities, such as connecting with land network 76 and/or cellular carrier system 70.

Databases 84 can be stored on a plurality of memory devices, such as a powered temporary memory or any suitable non-transitory, computer-readable medium. For example, the memory can be any of a number of different types of RAM (random-access memory, including various types of dynamic RAM (DRAM) and static RAM (SRAM)), ROM (read-only memory), solid-state drives (SSDs) (including other solid-state storage such as solid state hybrid drives (SSHDs)), hard disk drives (HDDs), magnetic or optical disc drives, that stores some or all of the software needed to carry out the various external device functions discussed herein. One or more databases 84 at the backend facility 80 can store various information and can include a database for storing information relating to the development of the predictive probability of distraction model and/or the predictive saliency distribution.

Figure 2:
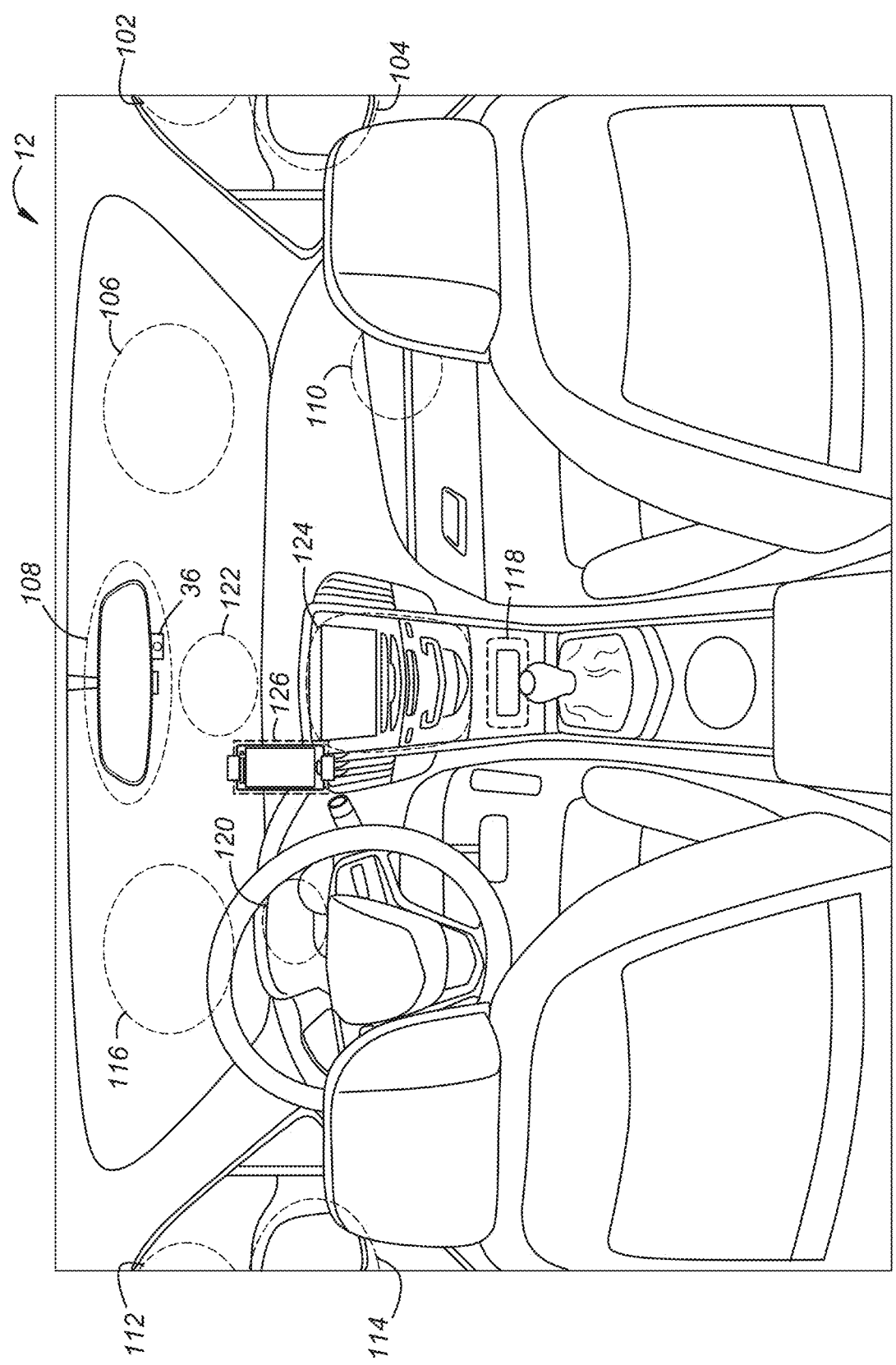
FIG. 2 illustrates various glance locations in and around the vehicle from the system of FIG. 1.

FIG. 2 illustrates a view of the interior of the vehicle 12 from the driver monitoring system of FIG. 1, showing a variety of different example glance locations 102-126 that may be used with the present systems and methods. The glance locations 102-126 correspond to the glance aim points of the driver of the vehicle. Accordingly, when the driver facing camera 36 receives information regarding the glance aim points of the driver, those glance aim points can be mapped to the glance locations 102-126, using the ECU 60 or the like. The glance locations 102-126 are schematically represented in FIG. 2 with dotted circles or outlines. However, it should be understood that the glance locations may be sized differently (e.g., larger or smaller than what is illustrated), shaped differently (e.g., the glance locations could be more amorphously shaped to correspond to specific vehicle features without any gaps between the glance locations), categorized differently (e.g., they could represent other areas of the vehicle, or there could be more or less locations than what is illustrated), etc.

The glance locations 102-126 represent areas in which the driver is likely to visually attend. In one particular example, although other examples are certainly possible, the glance locations include: a right window glance location 102, a right mirror glance location 104, a right forward glance location 106, a rearview mirror glance location 108, a passenger glance location 110, a left window glance location 112, a left mirror glance location 114, a left forward glance location 116, an interior object glance location 118, an instrument cluster glance location 120, a forward glance location 122, a center stack glance location 124, and a cell phone glance location 126. Again, other glance location types, shapes, etc. are possible, and it may even be possible for some glance locations to partially overlap. In the illustrated example, the driver's glance aim points are obtained by the driver facing camera 36 and then mapped or otherwise correlated to the various glance locations 102-126. These glance aim points/glance locations can be used in the methods detailed further below.

Figure 3:
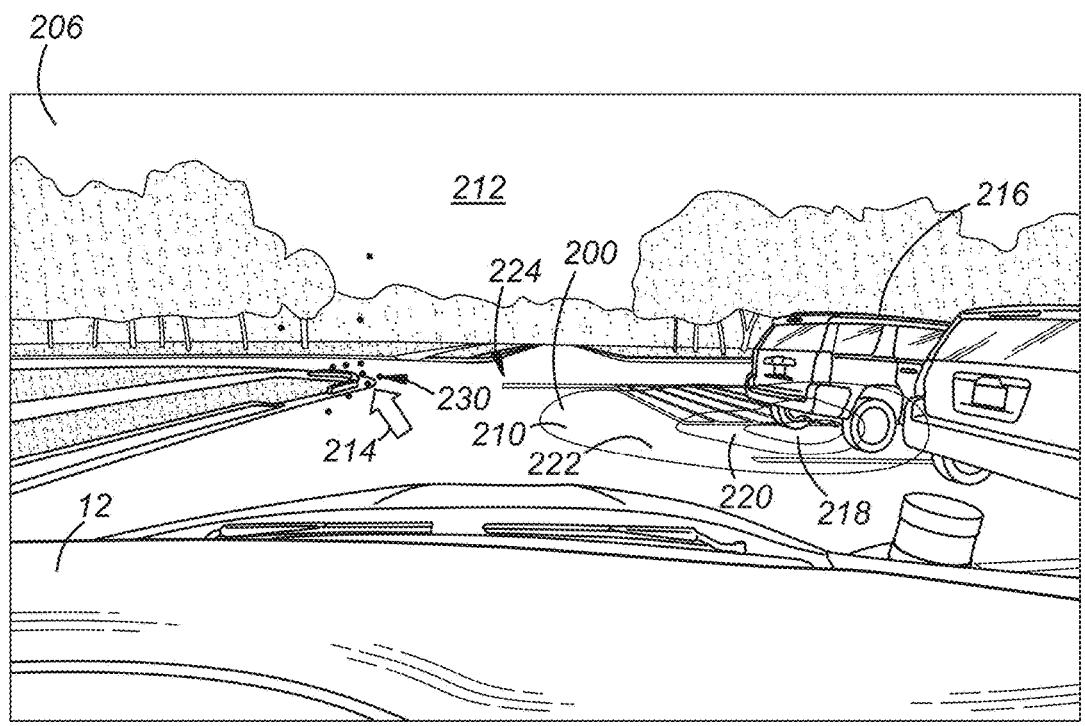
FIG. 3 illustrates a still-shot of a predictive saliency distribution in accordance with one embodiment.
Figure 4:
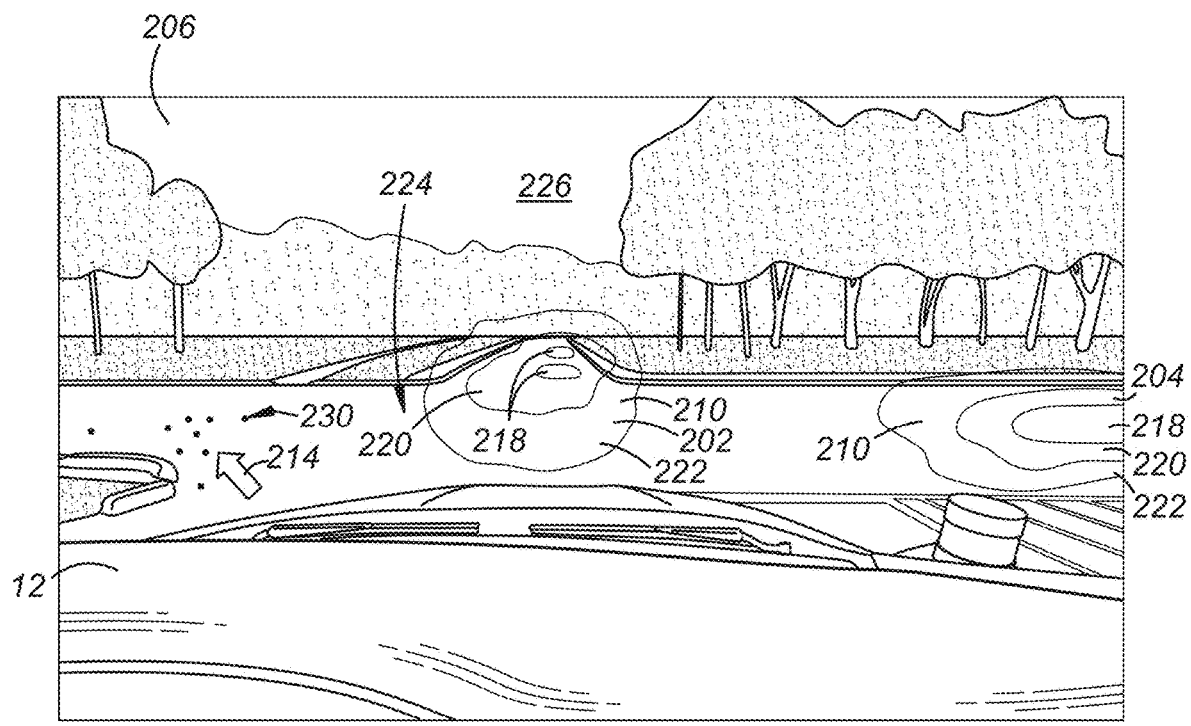
FIG. 4 illustrates another still-shot of two predictive saliency distributions, in accordance with one embodiment.

In addition to the glance aim points/glance locations 102-126, FIGS. 3 and 4 schematically illustrate various embodiments of a threat detection distribution 200, 202, 204 that may be used with the present systems and methods. More particularly, the illustrated threat detection distributions 200, 202, 204 are predictive saliency distributions 210 that may be used in some embodiments to supplement, corroborate, etc. the glance analyses. The threat detection distribution 200 is a predictive saliency distribution 210 that is overlaid on an analysis image 212 of the environment outside of the vehicle 12, such as that taken by the environmental camera 34. The predictive saliency distribution 210 is a spatiotemporal camera based predictive distribution of threats, and relating to threats, that other drivers would be likely to visually attend. The predictive saliency distribution 210 is highlighted in this example since a glance aim point 214 faces away from a potential threat (i.e., object vehicle 216). Given the divergence between the predictive saliency distribution 210 and the glance aim point estimation 214, such as a glance track probability distribution obtained from the driver facing camera 36, the systems and methods may alert the driver of the vehicle 12 as to the potential threat or object vehicle 216. The predictive saliency distribution 210 has a high warning zone 218, a moderate warning zone 220, and a low warning zone 222. In some embodiments, the high warning zone 218 may be colored red or the like to represent the highest estimated risk radius, the moderate warning zone 220 may transition from red to orange or yellow to represent a moderately estimated risk radius, and the low warning zone 222 may transition to green or blue to represent a low estimated risk radius.

The predictive saliency distribution 210 is similar to a dynamic heat map or the like that changes in accordance with movement of the vehicle 12 and/or movement of objects or threats in the environment. Development of the predictive saliency distribution is described in further detail below. In the illustrations in FIGS. 3 and 4, the predictive saliency distribution 210 includes the first threat 216, and then each zone 218-222 in each of the distributions 200, 202, 204 changes or morphs as the vehicle moves toward the intersection 224, which is shown closer in FIG. 4. FIG. 4 has a new analysis image 226, which is taken at a later time than the analysis image 212 of FIG. 3. In FIG. 4, given the glance aim point estimation 214, threat detection distributions 202, 204 may indicate areas in which the driver of the vehicle 12 should attend to (e.g., the predictive saliency distributions 210). The methods 1200, 1300 described below more fully detail the development of the various distributions schematically illustrated in FIGS. 3 and 4.

Figure 5:
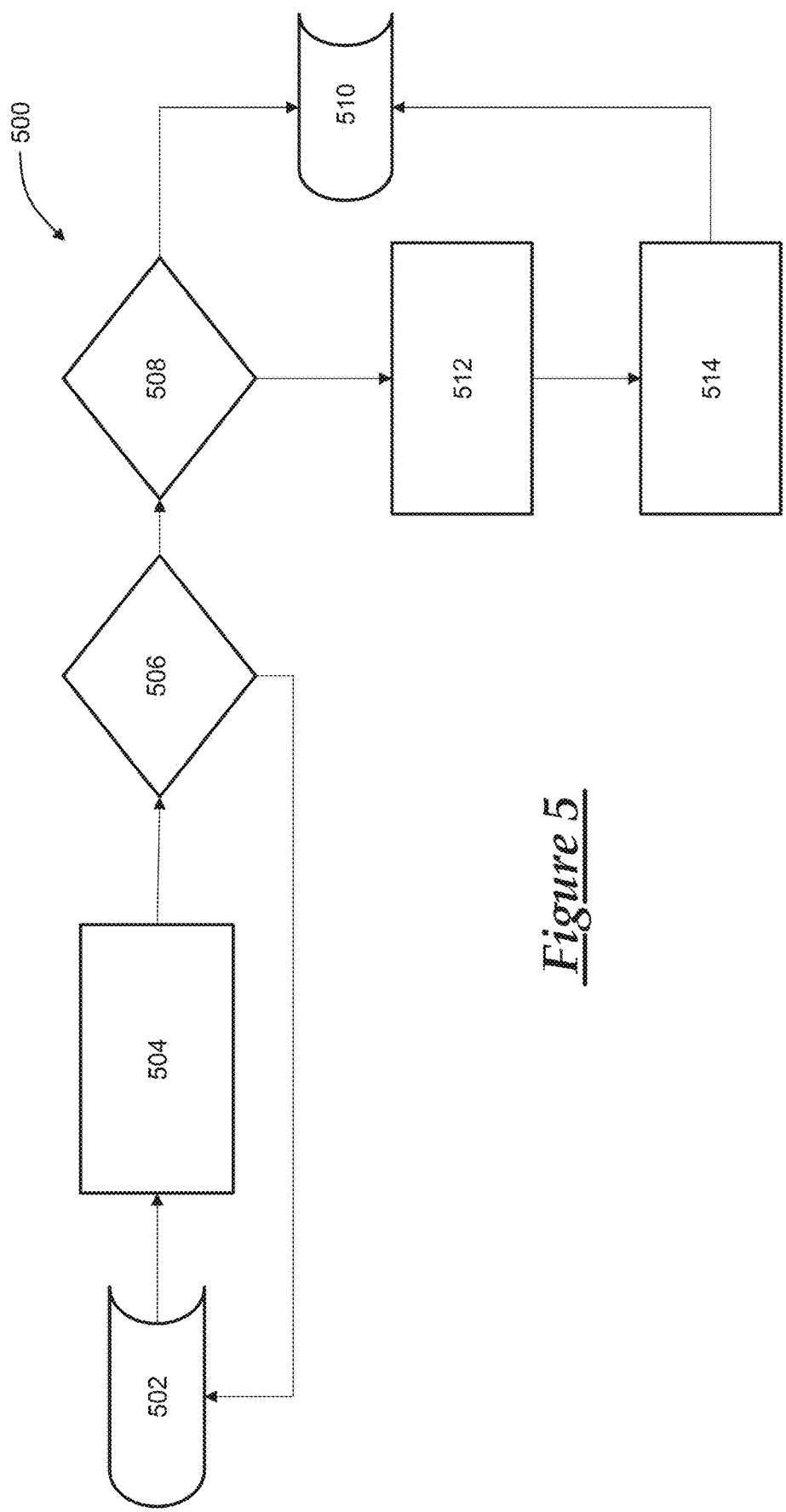
FIG. 5 is a flowchart of an embodiment of a method of operating a driver monitoring system, described within the context of the driver monitoring system of FIG. 1.

FIG. 5 illustrates a method 500 of operating a driver monitoring system for a vehicle, using the system 10 and vehicle 12 described above with respect to FIGS. 1-4. It should be understood that the steps of each method described herein are not necessarily presented in any particular order and that performance of some or all of the steps in an alternative order or concurrently is possible and is contemplated. Further, it is likely that the methods could be implemented in other systems that are different from the driver monitoring system 10 illustrated in FIG. 1, and that the description of the methods within the context of the system 10 is only an example.

Step 502 involves receiving a plurality of glance aim points for a driver of the vehicle 12. The glance aim points may be in the form of eye tracking data received at the ECU 60 from the driver facing camera 36. In some embodiments, the eye tracking data may represent several X,Y coordinates. This can be estimated or projected to the scene ahead of the vehicle 12, as schematically illustrated by the dots 230 in FIGS. 3 and 4. The glance aim points can also be mapped or otherwise correlated with the glance locations 102-126 illustrated in FIG. 2. Accordingly, the glance aim points can be glance aim point estimations of various glance locations in and around the vehicle 12. The glance aim points can be obtained by analyzing several frames from the driver facing camera video. In one particular embodiment, the frame rate for the driver facing camera 36 is about every 1/10 of a second.

Step 504 involves inputting the plurality of glance aim points from step 502 into a predictive probability of distraction model to obtain a predictive distraction distribution. The predictive distraction distribution is a graphical or numerical data scheme representing a crash or near crash probability based on prior data. To obtain the predictive distraction distribution, the glance aim points are processed using a predictive probability of distraction model. The predictive probability of distraction model may be implemented in a number of ways, one of which being generally illustrated in the breakout substeps of FIG. 6.

Figure 6:
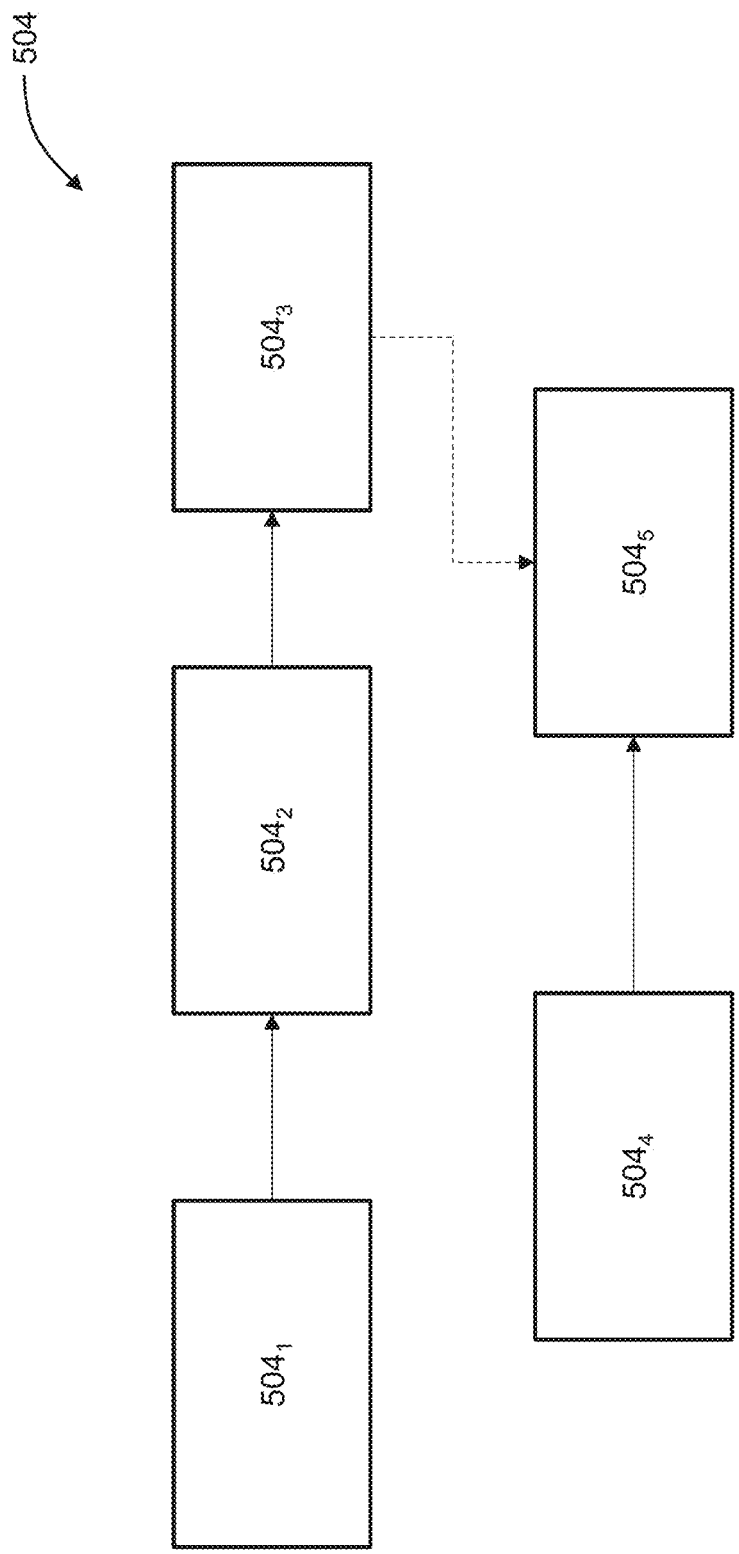
FIG. 6 is a flowchart showing substeps of one of the steps of the method of FIG. 5.

FIG. 6 illustrates a number of substeps $504_1$-$504_5$. Substeps $504_1$-$504_3$ represent an initial training and testing period that is generally accomplished before the overall method 500 is carried out, with substeps $504_4$-$504_5$ representing the classification aspect of step 504 that is run in real-time or almost-real-time, in conjunction with the method 500. It is possible and contemplated, however, for more training and testing to be done offsite (e.g., via computers 78 and backend facility 80), and updates from that training to be sent to the vehicle 12 for processing with the ECU 60 with the updated information in real-time or almost-real-time.

Substep $504_1$ involves obtaining prior data from an event database. In one embodiment, the event database includes labeled prior data from drivers. The labeling can include instances of event (crash or near crash) and baseline (normal) for given features or glance locations. The baseline includes normal driving given particular glance locations, whereas the crash/near crash includes glance locations observed or otherwise estimated when the driver was in a crash (or within a certain time period (e.g., 10 second) prior to the crash), or in a near crash scenario. Whether an event is labeled as near crash can depend on the desired sensitivity of the system. For example, instances of near crash may occur when the driver makes a corrective maneuver to avoid a crash (e.g., swerve or maximum braking). In a particular embodiment, the prior data was obtained or otherwise derived from the Virginia Tech Transportation Institute (VTTI) 100-Car data. Additionally, in this embodiment, the determination of crash/near crash may follow the VTTI standards and statistical analysis parameters for determining crash/near crash and baseline. In some embodiments, the prior data for substep $504_1$ may come from the driver of vehicle 12 or other vehicle drivers.

Figure 7:
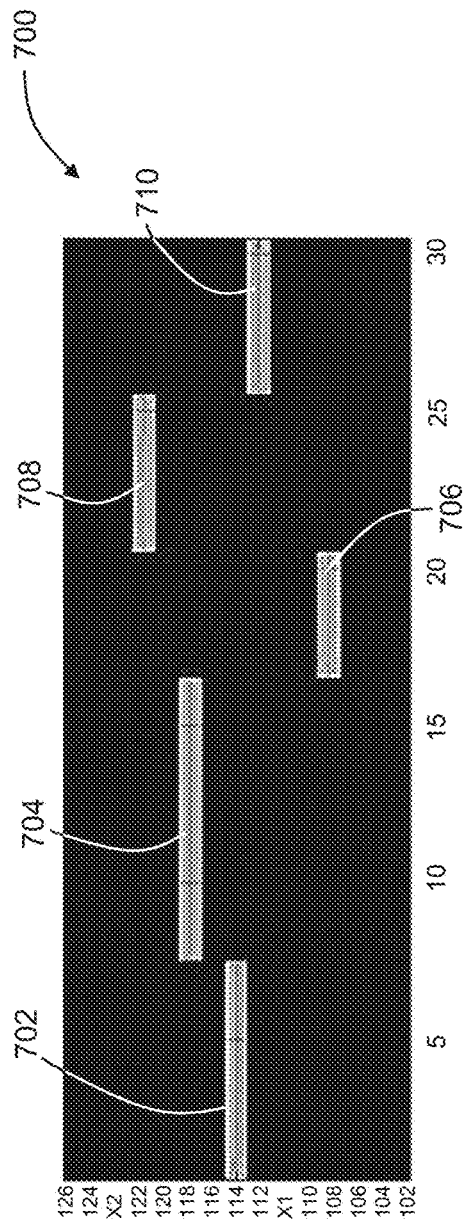
FIG. 7 is a plot of glance locations over time that may be used with the methods illustrated in FIGS. 5 and 6.
Figure 8:
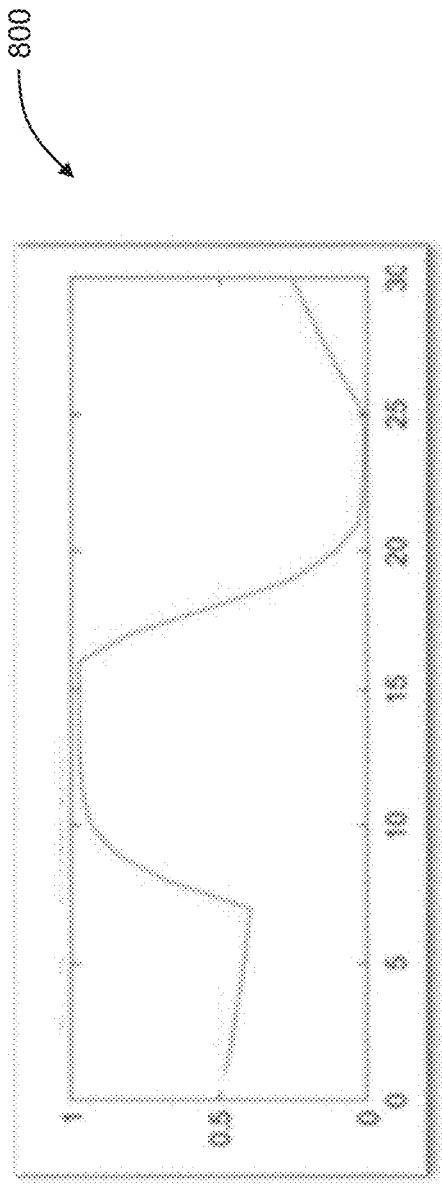
FIG. 8 shows a predictive distraction distribution in accordance with one embodiment.

Substep $504_2$ involves extracting features from the training data. In a first embodiment, the feature extraction step involves extracting glance aim points, such as the glance locations 102-126 illustrated in FIG. 2, which can be predefined for the model. FIGS. 7 and 8 illustrate a time series glance pattern analysis that may be used with this substep. FIG. 7 is a plot 700 of time on the x-axis in units of ⅒ of a second (3 seconds total) and the glance locations 102-126 illustrated in FIG. 2. X1 represents no video data, and X2 represents instances when the driver's eyes are closed. FIG. 8 has a corresponding x-axis representing time in units of ⅒ of a second (3 seconds total) with the probability of crash or near crash on the y-axis. FIG. 7 illustrates that the driver started looking at the left mirror glance location 114 (segment 702), then an interior object glance location 118 (segment 704), the rearview mirror glance location 108 (segment 706), the forward glance location 122 (segment 708), and finally the left window glance location 112 (segment 710). FIG. 8 is then a predictive distraction distribution 800 for the glance aim points illustrated in FIG. 7. The changes in the predictive distraction distribution 800 generally follow the changes in the graphical representation of FIG. 7 (e.g., variations occurring at around seven tenths of a second, sixteen tenths of a second, twenty tenths of a second, twenty-five tenths of a second). The predictive distraction distribution 800 may also take into account how long a driver maintains a glance aim point. For example, segment 704 in FIG. 7 corresponds to a glance aimpoint at an interior object glance location 118. The longer the driver maintains this glance aim point, the greater the probability of a crash/near crash event. This is reflected by the increase in slope in the corresponding segment in the predictive distraction distribution 800. Other example variations, patterns, etc. are certainly possible and will depend on the training data.

Figure 9:
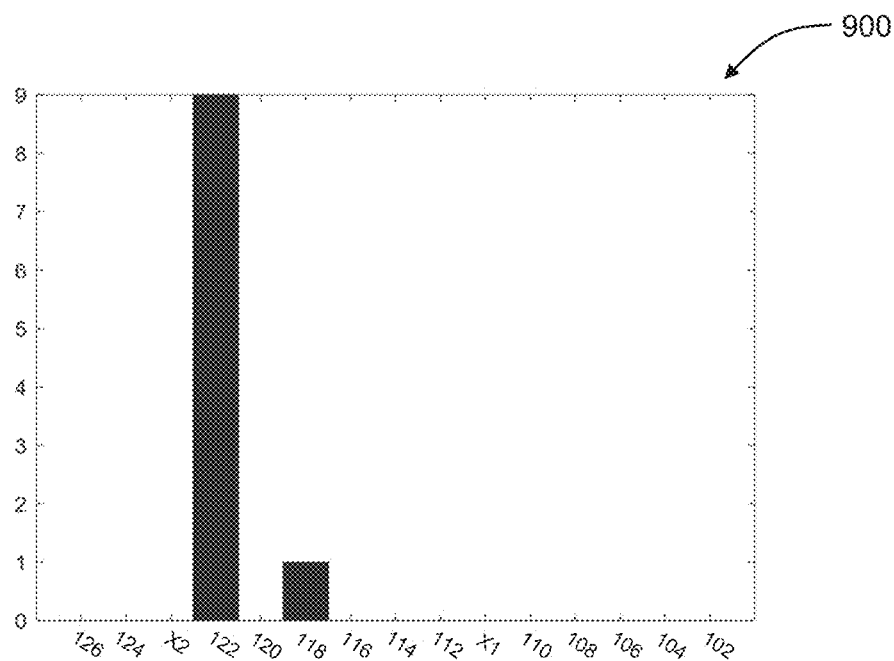
FIG. 9 is a histogram plot of glance location counts that may be used with the methods illustrated in FIGS. 5 and 6.
Figure 10:
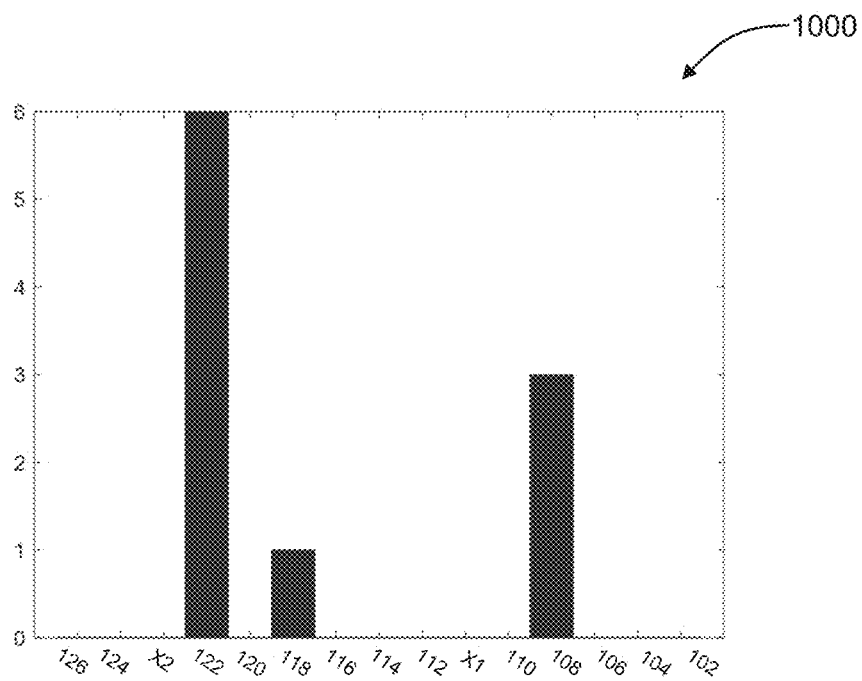
FIG. 10 is another histogram plot of glance location counts that may be used with the methods illustrated in FIGS. 5 and 6.
Figure 11:
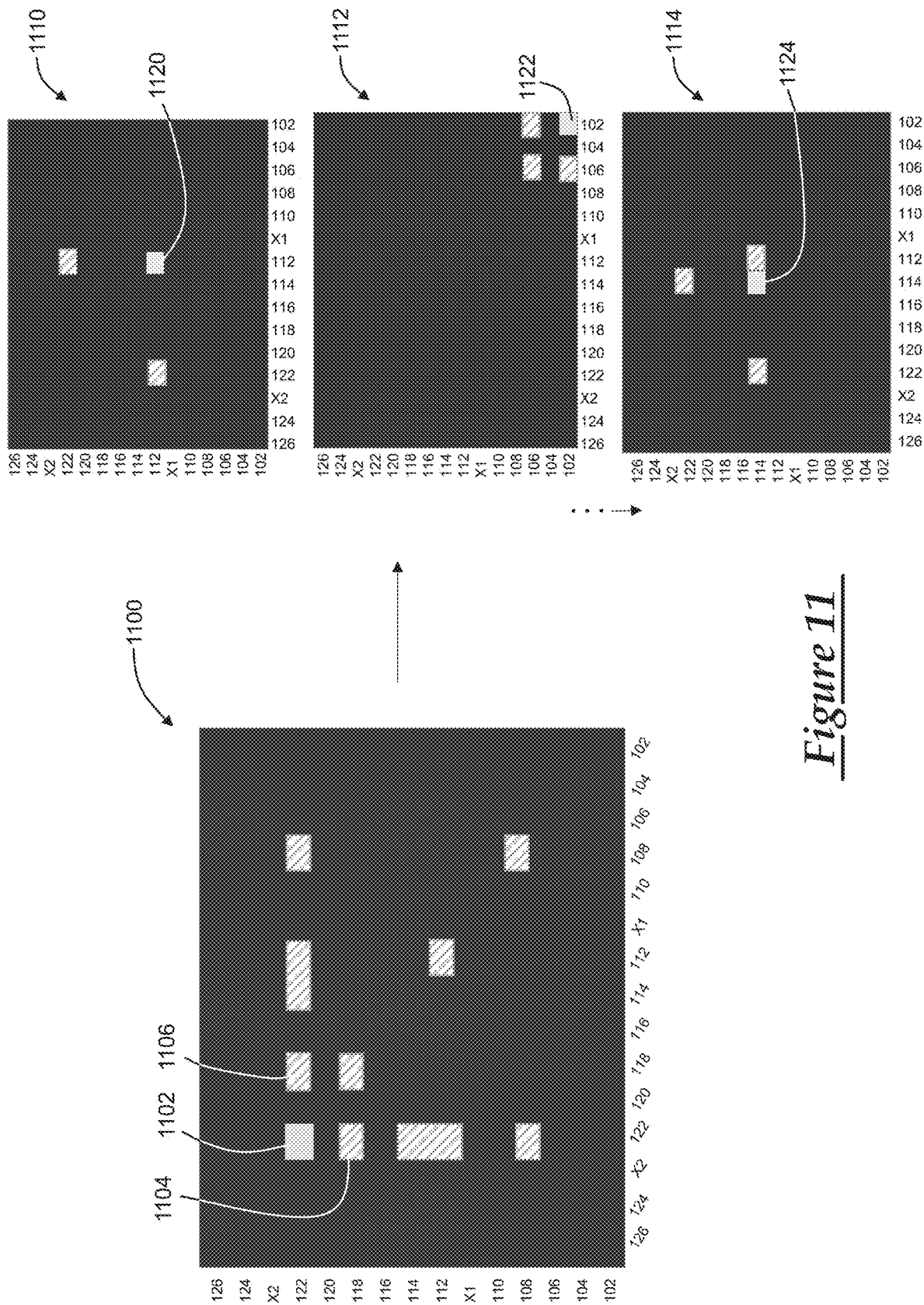
FIG. 11 shows various matrices that may be used with the methods illustrated in FIGS. 5 and 6.

In a second embodiment, the feature extraction sub step $504_2$ involves extracting features such as glance aim points and transitions between glance aim points. To accomplish the second embodiment, features such as glance locations and transitions are extracted using a graphical analysis, a co-occurrence matrix, and/or a non-negative matrix factorization (NMF) technique. Graphical representations of this second embodiment of feature extraction are shown in FIGS. 9, 10, and 11. In this example embodiment, the glance aim points from prior data are analyzed in one second increments for the graphical analysis, which includes two glance histograms 900, 1000 illustrated in FIGS. 9 and 10, respectively. In the histograms 900, 1000, the glance locations 102-126 are plotted on the x-axis (with X1 representing no video data and X2 representing eyes closed), and the counts for each glance location are along the y-axis. In this example, each histogram 900, 1000 represents one second, with a new frame taken every one tenth of a second (i.e., ten counts per histogram). Other example time periods and frame rates are certainly possible, as are alternative graphical formats.

The feature counts in this second embodiment of substep $504_2$ are used to obtain a co-occurrence matrix. Continuing with the example above, the histograms 900, 1000 are used to obtain a glance co-occurrence matrix 1100 which is illustrated in FIG. 11. In this example co-occurrence matrix 1100, the glance locations 102-126, X1, X2 are plotted against the glance locations 102-126, X1, X2. The co-occurrence matrix 1100 captures the glance transitions with the glance aim points. As shown, the highest frequency area 1102 at 122, 122 occurs given that the driver spent most of this 1-2 second period looking at the forward glance location 122. Area 1104 represents a count frequency or estimated count frequency of transitions of the driver's the glance aim point from the forward glance location 122 to the interior object glance location 118, with area 1106 representing the opposite transition (i.e., from interior object glance location 118 to forward glance location 122). As shown, the co-occurrence matrix 1100 includes other glance locations and glance transitions. The structure of the co-occurrence matrix can vary from the example co-occurrence matrix 1100, and its format and configuration will change depending on a number of factors, such as the number of glance locations, analysis timing, etc.

The co-occurrence matrix 1100 in this second embodiment of substep $504_2$ can be used to derive a develop a plurality of features that include glance locations and glance transitions that may be more likely to result in a crash/no crash scenario. In one example, an additional level of feature extraction is accomplished using a non-negative matrix factorization (NMF) technique. FIG. 11 also shows three sub-matrices 1110, 1112, 1114 which are produced by factorizing the co-occurrence matrix 1100 using the NMF technique. It should be noted, however, that more sub-matrices with more features are likely to be generated, but only three are illustrated in FIG. 11. NMF may be particularly useful to develop the sub-matrices 1110, 1112, 1114 given its tendency to cluster input data. The high frequency area in each sub-matrix may be used as the extracted feature for step $504_2$. In this example, the sub-matrix 1110 has a high frequency area 1120 corresponding to the left window glance location 112, 112. Sub-matrix 1112 has a high frequency area 1122 corresponding to the right window glance location 102, 102. Sub-matrix 1114 has a high frequency area 1124 corresponding to the left mirror glance location 114, 114. The NMF technique can help derive new features from the input prior data, such as glance transitions, which occur at the intersection of two different glance locations 102-126, X1, X2.

Substep $504_3$ involves developing an observation matrix of event probabilities for the given features (e.g., glance locations and/or glance transitions) extracted in substep $504_2$. The observation matrix contains feature likelihoods derived from the prior data, which is used to train the hidden Markov model (HMM) that is used for the real-time/almost-real-time aspects of the method 500. The observation matrix size may include a number of features in each row, with two columns being included for the probability of a given observed glance aim point given an event (e.g. crash and/or near crash) and the probability of a given observed glance aim point given the baseline (e.g., normal driving or not crash/near crash). Continuing with the first embodiment described above with respect to FIGS. 7 and 8, the observation matrix would include the glance locations, with the following example probabilities, as shown below in Table I.

TABLE I

|  | P(obs\|event) | P(obs\|baseline) |
|---|---|---|
| Cell phone 126 | 0.0450 | 0.0003 |
| Center stack 124 | 0.0203 | 0.0043 |
| Eyes closed X2 | 0.0457 | 0.0063 |
| Forward 122 | 0.4737 | 0.8313 |
| . | . | . |
| . | . | . |
| . | . | . |
| Right mirror 104 | 0.0037 | 0.0050 |
| Right window 102 | 0.0187 | 0.0200 |

The value, for example, of P(obs|event) for the cell phone glance location 126 is relatively high compared to other glance locations (e.g., it may be more likely to get into a crash/near crash event given a cell phone glance aim point). However, the P(obs|baseline) is relatively low for the cell phone glance location 126 because it is less common for drivers' glance aim points in general. These probabilities, and accordingly the observation matrices, will vary depending on prior data and training, and may be updated regularly (e.g., by transmitting new training data from the backend facility 80 to the ECU 60 via the wireless communications device 40). The observation matrix for the second embodiment may resemble the observation matrix illustrated in Table I above, but including the features decomposed from the co-occurrence matrix 1100 instead of only including glance locations. The observation matrix may represent clusters of glance locations and the frequency of occurrence of each cluster relative to all the other clusters.

Substeps $504_4$ and $504_5$ represent the real-time or almost-real-time aspects of the predictive probability of distraction model. Substep $504_4$ involves extracting features from the eye tracking data. This can be accomplished with the glance aim points obtained in step 502. Continuing with the first example embodiment with substep $504_3$, the glance aim points may be correlated and analyzed with respect to the glance locations 102-126 (with X1 and X2). Continuing with the second example embodiment with step $504_3$, the glance aim points may be correlated and analyzed to determine glance locations and glance transitions.

In substep $504_5$ a predictive distraction distribution is obtained. In one embodiment, the observation matrix can then be used in conjunction with an HMM to obtain the predictive distraction distribution for the real-time or almost-real-time glance aim points received from the driver. The observation matrix can accordingly be used to run a prediction on inputted test data using a forward prediction algorithm. In one embodiment, a Bayesian update is used, and the forward prediction algorithm (e.g., of being in an event state or baseline state) is calculated based on the glance location and the prior data with the following equation:

$$P(\text{state}_{t0}|\text{observation}_{t0}) = *P(\text{observation}_{t0}|\text{state}_{t0})$$
$$*\Sigma_{state_t} \text{ prior probability of a state} \quad \text{Equation 1:}$$

This can then be followed by a recursive algorithm where the following equation (Equation 2) is repeated in fixed time step increments:

$$P(\text{state}_{t+1}|\text{observation}_{1:t+1}) = \alpha * P(\text{observation}_{t+1}|\text{state}_{t+1})\Sigma_{state_t}P(\text{state}_{t+1}|\text{state}_t)*P(\text{state}_t|\text{observation}_{1:t}) \quad \text{Equation 2:}$$

Where, $\alpha$ is the normalizing coefficient; $P(\text{observation}_{t+1}|\text{state}_{t+1})$ is obtained from the observation matrix; $P(\text{state}_{t+1}|\text{state}_t)$ is the transition probability for transitioning from the previous state to a new state (i.e., the probability of going from the previous state that was predicted in the previous time step to another state (which could be event or baseline)); and $P(\text{state}_t|\text{observation}_{1:t})$ is the predicted state probability in the previous step. This Bayesian update, when applied to the time series glance aim point data, can give the probability of being in crash/near crash (i.e., event state).

The predictive probability distribution may be the result of the Bayesian update calculated above, or in some embodiments, a predicted probability, at least partially obtained using data from the observation matrix, may be analyzed for a specified window of time (e.g., 1 second) to arrive at the predicted probability distribution. In one advantageous embodiment (the first example embodiment above), the HMM takes glance aim points as input and predicts the current state (e.g., event or baseline; crash/near crash or normal). For each glance aim point input, the likelihood value from the observation matrix is looked up and then multiplied with the transition probability to get the predicted state for a given glance location. In another advantageous embodiment (the second example embodiment above), the co-occurrence matrix 1100 is fed into the HMM in a sliding window fashion in one-step increments. The HMM then provides the probability of distraction distribution (e.g., likelihood of crash/near crash). The sliding window approach in one-step increments can help progressively update the parameters of the predictive probability of distraction model.

Returning to the method 500 in FIG. 5, the predictive distraction distribution obtained in step 504 can be compared to a predictive distraction distribution threshold in step 506. Depending on the way the predictive distraction distribution is structured, step 506 asks whether the predictive distraction distribution fails to satisfy or exceed the predictive distraction distribution threshold. In one embodiment, step 506 asks whether the predictive distraction distribution value is greater than a predictive distraction distribution threshold. It should be understood that recitations of comparing steps such as "less than" or "greater than" are open-ended such that they could include "less than or equal to" or "greater than or equal to," respectively, and this will depend on the established parameter evaluations in the desired implementation. The predictive distraction distribution threshold can be a dynamic threshold that is at least partially learned from or based on prior data. In one more particular embodiment, the predictive distraction distribution threshold is a heuristically learned threshold that is at least partially based on the current glance location or glance transition, as will be detailed further below. In one more particular embodiment, the predictive distraction distribution threshold is a probability of 0.4-0.6 (advantageously 0.5) for specific glance locations, which again, is detailed further below. For example, the threshold may be lower for glance locations such as the cell phone glance location 126, and higher for glance locations such as the forward glance location 122. The threshold analysis in step 506 can help determine when the method 500 will trigger the system 10 to alert the driver of the vehicle 12. If the predictive distraction distribution does not satisfy or exceed the threshold, the method 500 may return to step 502 to continue monitoring the driver. If the predictive distraction distribution does satisfy or exceed the threshold, the method continues to step 508 to determine whether one or more informative glance locations are present.

Step 508 involves determining whether one or more informative glance locations are present in the plurality of received glance aim points from the driver of the vehicle 12. This step may look at glance locations within an analyzed time period (e.g., the last second, although other time periods are possible). If one or more informative glance locations are present, the method will continue to step 510 to alert the driver. If one or more informative glance locations are not present, the method will continue to step 512 to assess the current driving state. In one embodiment, the determination of informative glance locations depends on the prediction probability. For example, if the prediction probability or accuracy is higher than a certain amount (e.g., 85-90%) for a given glance location, then that may be considered an informative glance location. In another embodiment, the informative glance locations include the cell phone glance location 126, eyes closed X2, the interior object glance location 118, the passenger glance location 110, and the center stack glance location 124. In a further embodiment, if the recent glance locations predominantly include the following glance locations, then it can be determined that one or more informative glance locations are not present: the forward glance location 122, the rearview mirror glance location 108, the left and right window glance locations 102, 112, and the left and right mirror glance locations 104, 114.

Step 510 involves alerting the driver of the vehicle 12. Various alerts can be provided, such as with display 50. In an advantageous embodiment, the display 50 is an augmented reality display that highlights or provides some sort of visual indication to the driver that attention should be focused on a different location than he or she is currently focused on (e.g., a potential threat is highlighted on the augmented reality display or another display in the vehicle 12). In another embodiment, a directional audio cue is provided using audio system 56. For example, acoustical cues may be provided for directional audio awareness to help indicate where a detected threat is generally located. In yet another embodiment, a haptic feedback device 58 is used to alert the driver. For example, areas 92, 94 in the seat 90 can be activated to alert a driver of the vehicle 12 that there is a potential threat toward the corresponding side of the vehicle. Other HMI-based alerts are certainly possible, as well as various other alerts. For example, an autonomous driving action or the like may be performed to help avoid the threat. In general, the alert in step 510 helps lessen or abate the predicted driver distraction.

If it is determined in step 508 that one or more informative glance locations are not present, the method may continue to step 512 to determine the current driving state of the vehicle 12. This step can provide driving related contextual information to bolster the prediction accuracy. For example, the method 500 may not continue if there is a particular driving state present (e.g., the vehicle 12 is stopped, in reverse, in a parking lot, in a driveway, etc.). For example, if the vehicle 12 is stopped at a traffic light, the method 500 may wait before alerting the driver until the vehicle 12 is in motion.

Figure 12:
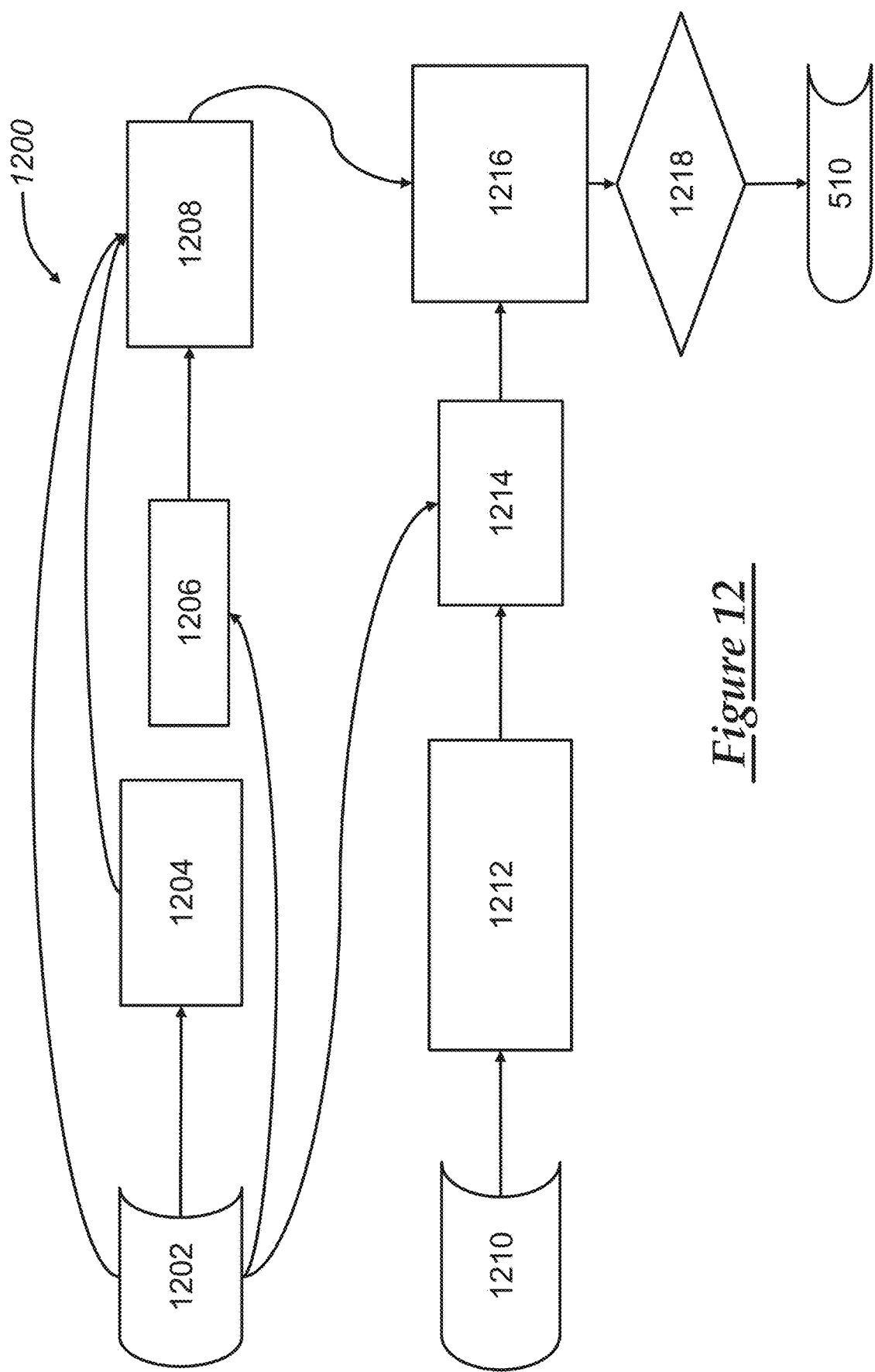
FIG. 12 is a flowchart illustrating the steps involved in a glance-saliency distribution analysis, described within the context of the driver monitoring system of FIG. 1.
Figure 13:
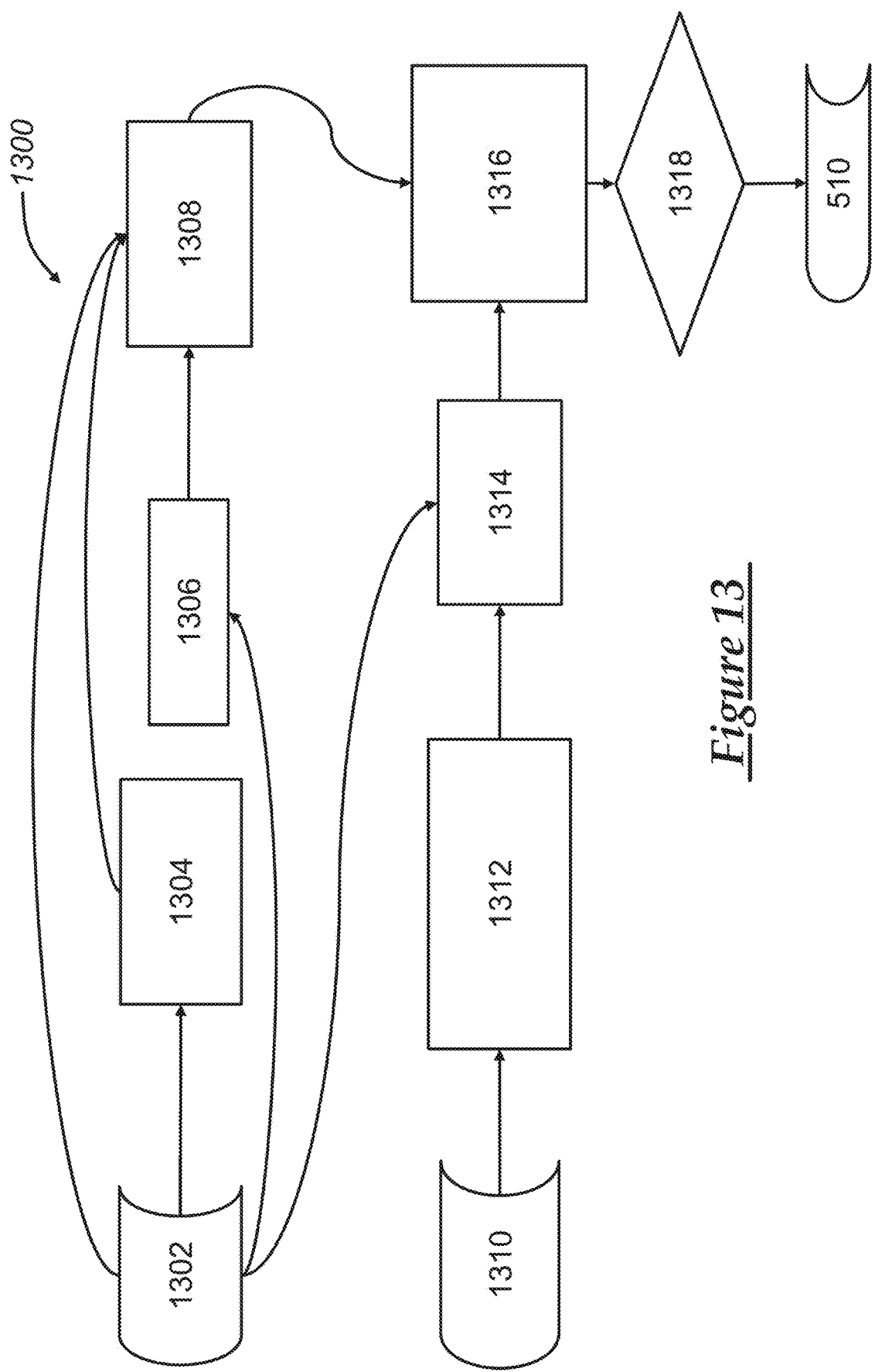
FIG. 13 is a flowchart illustrating the steps involved in a sensor-saliency distribution analysis, described within the context of the driver monitoring system of FIG. 1.

Step 512 fuses the predictive distraction distribution determination with a predictive saliency distribution. In some embodiments, the current driving state ascertained in step 510 may also be used as input in this step. For example, the predictive saliency distribution calculations summarized below may only be carried out if the vehicle 12 is in motion. The method 500 may rely on a predictive saliency distribution, instead of only the predictive distraction distribution, to determine whether to issue an alert to the driver (step 508). Step 512 may involve the generation of a glance-saliency distribution (method 1200 in FIG. 12) and/or the generation of a sensor-saliency distribution (method 1300 in FIG. 13).

In both methods 1200, 1300, similar steps are involved to generate the predictive saliency distribution that is used in each method. As addressed above, the predictive saliency distribution is a spatiotemporal camera based predictive distribution over threats that other drivers would be likely to visually attend. In some embodiments, training to initially develop one or more aspects of the predictive saliency distribution is at least partially accomplished using computers 78 and backend facility 80, with information relating to threats a driver would likely attend to then being sent locally to the vehicle 12 for real-time or almost-real-time processing. Accordingly, the predictive saliency distribution may be developed using a look-up table, an image matching algorithm, or some other compilation of particular threats, and those threats may be weighted or otherwise ranked (e.g., vehicle backing out of parking space as with the threat vehicle 216 in FIG. 3, oncoming traffic or intersections 224 as shown in FIGS. 3 and 4, or other potential threats, including but not limited to objects or pedestrians in the road, collision risks, road features such as sharp turns, etc.). Model training can be employed to develop the compilation of threats, for example, by watching drivers and recording glance patterns at particular objects incurred while driving. If, for example, a majority of drivers visually attended to an object or threat type, that object or threat type may be included in the compilation. Weighting and/or ranking may be accomplished using various techniques, including weighting by proximity, speed, acceleration, etc., using data obtained from the sensors 22-32, the camera 34, or some other source.

To develop the predictive saliency distribution, steps 1202, 1302 involve obtaining a plurality of initial environmental camera images before obtaining the analysis environmental camera image. The plurality of initial environmental camera images and the analysis environmental camera image are preferably consecutive images obtained or otherwise extracted from video feed from the environmental camera 34. The number of initial environmental camera images may depend on the batch size to be passed in a neural network, as will be detailed further below. In one advantageous embodiment, the number of initial environmental camera images is fifteen, with the sixteenth image being the analysis environmental camera image, such as the image 212 shown in FIG. 3. Once the plurality of initial environmental camera images are obtained, each analysis image may continue sequentially after the initial batch. For example, latency is not impacted with the analysis image 226 shown in FIG. 4, because a sufficient batch size has already been obtained, and subsequent processing of each individual analysis environmental image can be processed after the initial environmental camera images have been processed.

Steps 1204, 1304, in one particular embodiment, involve performing an optical flow analysis of the initial environmental camera images. In one embodiment, the optical flow analysis involves image matching of each of the initial environmental camera images. The optical flow analysis helps encode information relating to relative movement in the area ahead of the vehicle 12, or another area being monitored and employed with the methods 1200, 1300. In one particular example, OpenCV Deepflow is used in steps 1204, 1304. In other embodiments, variational energy minimization or another type of image matching optical flow analysis is employed.

Steps 1206, 1306, in one particular embodiment, involve semantic segmentation of the analysis environmental camera image. The semantic segmentation analysis may provide scenic information, and may output various regions, structures, segments, shapes etc. that are used to generate the predictive saliency distribution. The semantic segmentation may use any operable algorithm or segmentation technique, and will likely depend on the desired segmentation output structures. In some embodiments, each individual initial environmental image is also analyzed using a semantic segmentation analysis. In such an embodiment, an aggregate sequence of 16 segmented frames is input into steps 1208, 1308. However, alternatively numbered sequences are certainly possible (e.g., the initial batch may have more or less sequential image frames).

Steps 1208, 1308 involve generating the predictive saliency distribution. Steps 1208, 1308 take input from the analysis environmental camera image, the optical flow analysis results from steps 1204, 1304, and the semantic segmentation analysis results from steps 1206, 1306. In one embodiment, a neural network is used to generate the predictive saliency distribution, and the predictive saliency distribution is a probability distribution function indicating potential threat areas in the analysis environmental image that other drivers would likely attend to. In one example, as illustrated in FIGS. 3 and 4, the predictive saliency distribution 210 is a heat map that dynamically highlights various zones in the sequential images, with the distribution 210 changing or morphing as the relative positions of various threats in the images change. The predictive saliency distribution 210 can also be represented in other various forms, such as numerically, graphically, or using another distribution function model.

Both methods 1200, 1300 use the predictive saliency distribution generated in steps 1202-1208 and 1302-1308, respectively, as input. The methods 1200, 1300 vary in that, in addition to the predictive saliency distribution, a glance aim point estimation (method 1200: steps 1210-1212) and a threat weighted occupancy probability distribution (method 1300: steps 1310-1312) are used as inputs. Accordingly, the method 1200 is more glance-saliency focused while the method 1300 is more sensor-saliency focused, with either method being capable of generating an alert in the overall method 500 (step 510).

Step 1210 of the method 1200 involves receiving eye tracking data from the driver of the vehicle. This may be accomplished using the glance aim points received in step 502 of the method 500, with, for example, the driver facing camera 36. In some embodiments, the eye tracking data may represent several X,Y coordinates. This can be estimated or projected to the scene ahead of the vehicle 12, as schematically illustrated by the dots 230 in FIGS. 3 and 4. A glance aim point estimation can be obtained by analyzing several frames from the driver facing camera video. In some embodiments, the frame rate for the driver facing camera 36 (e.g., about every 1/10 of a second) is higher than the frame rate for the environmental camera 34 so that more data for the glance aim point estimation can be achieved.

Step 1212 of the method 1200 involves determining a glance track probability distribution using the eye tracking data from step 1210. The glance track probability distribution is a glance aim point estimation that can represent clusters or groups of coordinated eye movements (e.g., a model distribution over the scene). In one embodiment, a 2D hidden Markov model (HMM) is used to determine the glance track probability distribution from the received eye tracking data. The 2D HMM may be an advantageous model given the sequence-based image analysis.

Step 1214 of the method 1200 involves creating a homographic projection to reconcile the glance track probability distribution and the analysis environmental camera image. The homographic projection accordingly reconciles the input from the environmental camera 34 and the driver facing camera 36. The processing attributes and algorithms involved in creating the homographic projection will depend on various factors, such as the mounting arrangement of each of the cameras 34, 36, the type of cameras, the sizes of the images, etc. Creating the homographic projection in step 1214 allows for a more efficient and accurate comparison with the predictive saliency distribution calculated in step 1208.

Step 1216 involves determining a glance-saliency divergence between the predictive saliency distribution determined in steps 1202-1208 and the glance track probability distribution determined in steps 1210-1214. The larger the divergence, the more likely that a driver is not paying attention to a salient threat to the vehicle 12. In an advantageous embodiment, step 1216 involves calculating the Kullback-Leibler (KL) divergence between the predictive saliency distribution and the glance track probability distribution. Combining the KL divergence (the glance-saliency divergence) with the neural network for the predictive saliency distribution can allow for more complex approximating and more accurate determinations of errant threat detection. Other methods of determining the divergence in step 1216 include, but are not limited to, scan salience, histogram analysis, pixel linearity, analyzing the area under a ROC (receiver operating characteristic) curve, or some other operable method.

Step 1218 of the method 1200 involves comparing the glance-saliency divergence determined in step 1216 to a glance-saliency divergence threshold. In one embodiment, step 1218 asks whether the glance-saliency divergence is greater than a glance-saliency divergence threshold. It should be understood that recitations of comparing steps such as "less than" or "greater than" are open-ended such that they could include "less than or equal to" or "greater than or equal to," respectively, and this will depend on the established parameter evaluations in the desired implementation. The glance-saliency divergence threshold can be a dynamic threshold that is at least partially learned from or based on prior data. In one more particular embodiment, the glance-saliency divergence threshold is a heuristically learned threshold that is at least partially based on the current salience and/or glance pattern. For example, if the predictive saliency distribution indicates a possible threat toward the periphery (e.g., approaching traffic from a side street), but the driver is looking to the center, the threshold may be lower. In contrast, there is a central bias for drivers to stare toward the horizon. If the predictive saliency distribution indicates a potential threat on the highway ahead of the vehicle while the driver is looking at a peripheral region, the threshold may be higher. Accordingly, the glance-saliency threshold may be adaptable depending on the type of threat, the position of the driver's glance given the driving environment, or other factors. Advantageously, the glance-saliency threshold is developed such that a high probability saliency prediction (e.g., zones 218, 220 in the predictive saliency distribution 210) with a low probability glance aim point estimation, will trigger the system 10 to alert the driver of the vehicle 12. Accordingly, after step 1218, the method 1200 will revert back to step 510 of the method 500 to alert the driver if the glance-saliency divergence is greater than the glance-saliency divergence threshold. In such a situation, the driver may be distracted, tired, or non-attentive.

As described above, both methods 1200, 1300 use the predictive saliency distribution generated in steps 1202-1208 and 1302-1308, respectively, as input. The method 1300 in FIG. 13 varies from the method 1200 in FIG. 12, in that the method 1300 uses a threat weighted occupancy probability distribution (method 1300: steps 1310-1312) as input instead of the glance aim point estimation (method 1200: steps 1210-1212).

Step 1310 of the method 1300 involves receiving external sensor readings. This may be accomplished using the object detection sensor 32, which is advantageously a radar sensor or a lidar sensor. In a more particular embodiment, the sensor readings received in step 1310 are object detection readings from a penetrating radar sensor. The representation of information from the sensor readings can be provided in a number of different operable forms. For example, a Markov random field (MRF) model can be used to estimate an occupancy grid, using sensor readings from object detection sensor 32 that can be filtered and/or smoothed.

Step 1312 of the method 1300 involves determining a threat weighted occupancy probability distribution from one or more of the sensor readings obtained in step 1310. Continuing with the example provided above, the occupancy grid can be used to at least partially determine the threat weighted occupancy probability distribution. The occupancy grid can be developed using an MRF model, which each grid cell generally representing a location of the threat, with one or more aspects such as inertia, relative velocity, etc. being represented in a different dimension (e.g., along the Z-axis with location being designated via X, Y coordinates, with some embodiments possible having three or more dimensions). Accordingly, in this embodiment, the occupancy grid is the threat weighted occupancy probability distribution; however, other methods for generating the threat weighted occupancy probability distribution are certainly possible. For example, sensor data may be provided in different coordinate schemes or in other formats that are more suitable for different distribution types. Additionally, step 1312 may use information such as host vehicle speed as indicated by readings from speed sensors 22-28, or information from other system components, to help generate the threat weighted occupancy probability distribution.

Step 1314 of the method 1300 involves creating an alignment projection to reconcile the threat weighted occupancy probability distribution and the analysis environmental camera image obtained in step 1302. In one embodiment, the alignment projection is a homographic projection, although other alignment techniques are possible and may depend on the type of sensor 32. The alignment projection accordingly reconciles the input from the environmental camera 34 and the object detection sensor 32. The processing attributes and algorithms involved in creating the projection will depend on various factors, such as the mounting arrangement of the camera 34, the type of sensor 32, the size of the images, the range of the sensor 32, etc. Creating the alignment projection in step 1314 allows for a more efficient and accurate comparison with the predictive saliency distribution calculated in step 1308.

Step 1316 involves determining a sensor-saliency divergence between the predictive saliency distribution determined in steps 1302-1308 and the threat weighted occupancy probability distribution determined in steps 1310-1314. The larger the divergence, the more likely that there are anomalous environmental sensor indications. In some instances, the object detection sensor 32 may indicate out of the ordinary objects or maneuvers not triggered or rendered risky with the predictive saliency distribution. These anomalies could help with training or developing the predictive saliency distribution, alerting a driver as to misaligned sensors (e.g., with a high probability saliency prediction and a low probability threat weighted occupancy detection), and/or alerting a driver as to a low probability salient threat (e.g., one that most drivers would not assess) yet is still risky as indicated by a high probability threat weighted occupancy detection. In an advantageous embodiment, step 1316 involves calculating the Kullback-Leibler (KL) divergence between the predictive saliency distribution and the threat weighted occupancy probability distribution. Combining the KL divergence (the sensor-saliency divergence) with the neural network for the predictive saliency distribution can allow for more complex approximating and more accurate determinations of errant threat detection. Other methods of determining the divergence in step 1316 include, but are not limited to, scan salience, histogram analysis, pixel linearity, analyzing the area under a ROC (receiver operating characteristic) curve, or some other operable method.

Step 1318 of the method 1300 involves comparing the sensor-saliency divergence determined in step 1316 to a sensor-saliency divergence threshold. In one embodiment, step 1318 asks whether the sensor-saliency divergence is greater than a sensor-saliency divergence threshold. Again, it should be understood that recitations of comparing steps such as "less than" or "greater than" are open-ended such that they could include "less than or equal to" or "greater than or equal to," respectively, and this will depend on the established parameter evaluations in the desired implementation. As with the predictive distraction distribution threshold and the glance-saliency divergence threshold, the sensor-saliency divergence threshold can be a dynamic threshold that is at least partially learned from or based on prior data. In one more particular embodiment, the sensor-saliency divergence threshold is a heuristically learned threshold that is at least partially based on the current salience and/or sensor readings. For example, if a penetrating radar object detection sensor 32 indicates a biker is approaching the vehicle from behind a hedge on the side of the vehicle 12, yet the predictive saliency distribution indicates no risk, the threshold could be lower. The threshold may be higher for more salient threats directly ahead of the vehicle. Accordingly, the sensor-saliency threshold may be adaptable depending on the type of threat, the type of sensor, or other factors. Advantageously, the sensor-saliency threshold is developed such that a low probability saliency prediction (e.g., zone 222 or no zone in the predictive saliency distribution 210) with a high probability threat weighted occupancy estimation, will trigger the system 10 to alert the driver of the vehicle 12. Accordingly, after step 1318, the method 1300 will revert back to step 510 of the method 500 to alert the driver if the glance-saliency divergence is greater than the glance-saliency divergence threshold.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation. In addition, the term "and/or" is to be construed as an inclusive OR. Therefore, for example, the phrase "A, B, and/or C" is to be interpreted as covering any one or more of the following: "A"; "B"; "C"; "A and B"; "A and C"; "B and C"; and "A, B, and C."

What is claimed is:

1. A method of operating a driver monitoring system for a vehicle, comprising the steps of:
   receiving a plurality of glance aim points for a driver of the vehicle;
   inputting the plurality of glance aim points into a predictive probability of distraction model to obtain a predictive distraction distribution, wherein the predictive probability of distraction model includes a hidden Markov model (HMM);
   determining whether one or more informative glance locations are present in the plurality of glance aim points;
   comparing the predictive distraction distribution to a predictive distraction distribution threshold when one or more informative glance locations are present in the plurality of glance aim points; and
   alerting the driver when the predictive distraction distribution satisfies or exceeds the predictive distraction distribution threshold.

2. The method of claim 1, wherein the predictive distraction distribution is a graphical or numerical data scheme representing a crash or near crash probability based on prior data.

3. The method of claim 1, further comprising the step of fusing the predictive distraction distribution with a predictive saliency distribution when one or more informative glance locations are not present in the plurality of glance aim points.

4. The method of claim 3, further comprising the step of determining a current driving state and using the current driving state as input when fusing the predictive saliency distribution and the predictive distraction distribution.

5. The method of claim 1, wherein the predictive probability of distraction model includes using an observation matrix of event probabilities for given glance locations to obtain the predictive distraction distribution.

6. The method of claim 1, wherein the predictive probability of distraction model includes developing a graphical representation of the plurality of glance aim points.

7. The method of claim 6, wherein the graphical representation is a histogram plot of the plurality of glance aim points.

8. The method of claim 6, wherein the graphical representation is used to develop a glance co-occurrence matrix which captures a plurality of glance transitions with the plurality of glance aim points.

9. The method of claim 8, further comprising the step of feeding the glance co-occurrence matrix into the hidden Markov model (HMM).

10. The method of claim 9, wherein the feeding is accomplished in a sliding window fashion in one-step increments.

11. A method of operating a driver monitoring system for a vehicle, comprising the steps of:
    receiving a plurality of glance aim points for a driver of the vehicle;
    inputting the plurality of glance aim points into a predictive probability of distraction model to obtain a predictive distraction distribution, wherein the predictive probability of distraction model includes developing a graphical representation of the plurality of glance aim points, wherein the graphical representation is used to develop a glance co-occurrence matrix which captures a plurality of glance transitions with the plurality of glance aim points, and further comprising the step of factorizing the glance co-occurrence matrix using a non-negative matrix factorization (NMF) technique to develop a plurality of NMF factors;
    determining whether one or more informative glance locations are present in the plurality of glance aim points;
    comparing the predictive distraction distribution to a predictive distraction distribution threshold when one or more informative glance locations are present in the plurality of glance aim points; and
    alerting the driver when the predictive distraction distribution satisfies or exceeds the predictive distraction distribution threshold.

12. The method of claim 11, further comprising the step of deriving a plurality of features from the plurality of non-negative matrix factorization (NMF) factors.

13. The method of claim 12, further comprising the step of comparing the plurality of features to an observation matrix of event probabilities for given glance locations and glance transitions to obtain the predictive distraction distribution.

14. A driver monitoring system for a vehicle, comprising:
    a driver facing camera; and
    an electronic control unit (ECU) operably coupled to the driver facing camera, wherein the ECU is configured to receive a plurality of glance aim points for a driver of the vehicle from the driver facing camera; input the plurality of glance aim points into a predictive probability of distraction model to obtain a predictive distraction distribution, wherein the predictive probability of distraction model includes a hidden Markov model (HMM); determine whether one or more informative glance locations are present in the plurality of glance aim points; compare the predictive distraction distribution to a predictive distraction distribution threshold when one or more informative glance locations are present in the plurality of glance aim points;

and alert the driver when the predictive distraction distribution satisfies or exceeds the predictive distraction distribution threshold.

* * * * *